US012650836B2

(12) United States Patent
Guttridge et al.

(10) Patent No.: US 12,650,836 B2
(45) Date of Patent: Jun. 9, 2026

(54) GAP IDENTIFICATION AND SOLUTION RECOMMENDATION FOR COMPLEX SOFTWARE ARCHITECTURE

(71) Applicant: The Toronto-Dominion Bank, Toronto (CA)

(72) Inventors: Francis James Alexander Guttridge, Vaughan (CA); Dino Paul D'Agostino, Richmond Hill (CA); A Warren Pratten, London (CA); Shahzad Mohammed, Toronto (CA); Arvind Chikkalavalasa, Milton (CA); Waqas Nawaz, Waterdown (CA)

(73) Assignee: The Toronto-Dominion Bank, Toronto (CA)

( * ) Notice: Subject to any disclaimer, the term of this patent is extended or adjusted under 35 U.S.C. 154(b) by 243 days.

(21) Appl. No.: 18/459,323

(22) Filed: Aug. 31, 2023

(65) Prior Publication Data

US 2025/0077227 A1      Mar. 6, 2025

(51) Int. Cl.
G06F 8/75        (2018.01)
G06F 8/10        (2018.01)

(52) U.S. Cl.
CPC . G06F 8/75 (2013.01); G06F 8/10 (2013.01)

(58) Field of Classification Search
CPC ................................... G06F 8/10; G06F 8/75
USPC ......................................................... 717/120
See application file for complete search history.

(56) References Cited

U.S. PATENT DOCUMENTS

| | | | |
|---|---|---|---|
| 7,120,643 | B2 | 10/2006 | Dill |
| 7,222,138 | B2 | 5/2007 | Fomenko |
| 7,376,645 | B2 | 5/2008 | Bernard |
| 7,716,254 | B2 | 5/2010 | Sarkar et al. |
| 7,880,749 | B2 | 2/2011 | Favart et al. |
| 8,775,462 | B2 | 7/2014 | Coldicott et al. |
| 8,793,151 | B2 | 7/2014 | DelZoppo et al. |
| 9,262,134 | B2 | 2/2016 | Kelapure et al. |
| 9,342,279 | B2 | 5/2016 | Zhang et al. |
| 9,372,669 | B2 | 6/2016 | Jalaldeen et al. |
| 9,389,851 | B1 | 7/2016 | Nelson et al. |
| 9,477,444 | B1 | 10/2016 | Shen et al. |
| 9,519,464 | B2 | 12/2016 | Dang et al. |
| 9,864,982 | B2 | 1/2018 | Bristow et al. |
| 10,163,085 | B2 | 12/2018 | D'Agostino et al. |
| 10,178,246 | B1 | 1/2019 | Horvath et al. |

(Continued)

OTHER PUBLICATIONS

Nassif et al., "Neural network models for software development effort estimation: a comparative study", 2016, Springer, pp. 2369-2381. (Year: 2016).*

(Continued)

*Primary Examiner* — Ted T. Vo

(57)        ABSTRACT
An example operation may include one or more of receiving a plurality of architecture documents of a plurality of different domains of a software architecture, identifying a missing component that is missing from within the software architecture between a first domain and a second domain among the plurality of domains based on execution of a generative artificial intelligence (GenAI) model based on the plurality of architecture documents of the software architecture, generating a recommended modification to the software architecture based on the identified missing component, and displaying the recommended modification via a user interface.

20 Claims, 21 Drawing Sheets

200

(56) References Cited

U.S. PATENT DOCUMENTS

| | | | |
|---|---|---|---|
| 10,181,114 B2 | 1/2019 | Tseretopoulos et al. |
| 10,289,615 B2 | 5/2019 | Nijor et al. |
| 10,303,533 B1 | 5/2019 | Panov et al. |
| 10,339,931 B2 | 7/2019 | Tseretopoulos et al. |
| 10,346,824 B2 | 7/2019 | Chan et al. |
| 10,360,303 B2 | 7/2019 | Volkovs et al. |
| 10,379,994 B1 | 8/2019 | Giles et al. |
| 10,405,146 B1 | 9/2019 | Kuruvilla et al. |
| 10,437,565 B2 | 10/2019 | Hao et al. |
| 10,438,206 B2 | 10/2019 | Jivraj et al. |
| 10,440,196 B2 | 10/2019 | Horvath et al. |
| 10,440,197 B2 | 10/2019 | Horvath et al. |
| 10,460,748 B2 | 10/2019 | Tseretopoulos et al. |
| 10,482,675 B1 | 11/2019 | Sutter et al. |
| 10,503,486 B2 | 12/2019 | Dimitrov et al. |
| 10,572,473 B2 | 2/2020 | Allen et al. |
| 10,659,400 B2 | 5/2020 | Moon et al. |
| 10,698,902 B2 | 6/2020 | Tseretopoulos et al. |
| 10,706,635 B2 | 7/2020 | Sutter et al. |
| 10,708,721 B2 | 7/2020 | Kuruvilla et al. |
| 10,728,259 B2 | 7/2020 | McCarter et al. |
| 10,756,982 B2 | 8/2020 | Bai |
| 10,776,619 B2 | 9/2020 | Collinson et al. |
| 10,817,264 B1 | 10/2020 | Goodsitt et al. |
| 10,824,941 B2 | 11/2020 | Volkovs et al. |
| 10,831,923 B2 | 11/2020 | Dunjic et al. |
| 10,832,047 B2 | 11/2020 | Moghtadai |
| 10,862,897 B2 | 12/2020 | D'Agostino et al. |
| 10,867,292 B2 | 12/2020 | Lin et al. |
| 10,867,293 B2 | 12/2020 | Bristow et al. |
| 10,878,816 B2 | 12/2020 | Tseretopoulos et al. |
| 10,902,220 B2 | 1/2021 | Lozon et al. |
| 10,922,665 B2 | 2/2021 | Miller et al. |
| 10,943,605 B2 | 3/2021 | Tseretopoulos et al. |
| 10,949,337 B1 | 3/2021 | Yalla et al. |
| 10,956,127 B2 | 3/2021 | Welp et al. |
| 10,977,617 B2 | 4/2021 | Tseretopoulos et al. |
| 10,983,761 B2 * | 4/2021 | Svyatkovskiy ..... G06F 16/9027 |
| 10,997,227 B2 | 5/2021 | Agrawal et al. |
| 11,004,187 B2 | 5/2021 | Kuruvilla et al. |
| 11,017,028 B2 | 5/2021 | Dunjic et al. |
| 11,017,156 B2 | 5/2021 | Hwang |
| 11,023,689 B1 | 6/2021 | Sippel et al. |
| 11,030,068 B1 | 6/2021 | Agarwal et al. |
| 11,030,415 B2 | 6/2021 | Volkovs et al. |
| 11,055,924 B2 | 7/2021 | Navarro et al. |
| 11,061,638 B2 | 7/2021 | Lam |
| 11,070,448 B2 | 7/2021 | Miller et al. |
| 11,086,859 B2 | 8/2021 | Nijor et al. |
| 11,087,314 B2 | 8/2021 | Gandhi et al. |
| 11,100,168 B2 | 8/2021 | Miller et al. |
| 11,140,143 B2 | 10/2021 | Moon et al. |
| 11,144,921 B2 | 10/2021 | Dunjic et al. |
| 11,144,998 B2 | 10/2021 | Kuruvilla et al. |
| 11,145,169 B2 | 10/2021 | Pratten et al. |
| 11,182,860 B2 | 11/2021 | Kuruvilla et al. |
| 11,194,688 B1 | 12/2021 | Featonby et al. |
| 11,200,328 B2 | 12/2021 | Shpurov et al. |
| 11,200,411 B2 | 12/2021 | Rizvi et al. |
| 11,210,857 B2 | 12/2021 | Rizvi et al. |
| 11,222,286 B2 | 1/2022 | Choe et al. |
| 11,232,304 B2 | 1/2022 | Navarro et al. |
| 11,237,802 B1 | 2/2022 | Krishnamoorthy et al. |
| 11,238,377 B2 | 2/2022 | Polleri et al. |
| 11,250,063 B2 | 2/2022 | Krasadakis |
| 11,270,206 B2 | 3/2022 | Kursun |
| 11,276,257 B2 | 3/2022 | Moghtadai et al. |
| 11,301,245 B2 | 4/2022 | DeLuca et al. |
| 11,303,642 B2 | 4/2022 | Dunjic et al. |
| 11,314,620 B1 | 4/2022 | Lin et al. |
| 11,334,574 B2 | 5/2022 | Caputo et al. |
| 11,347,744 B2 | 5/2022 | Tseretopoulos et al. |
| 11,349,871 B2 | 5/2022 | Moon et al. |
| 11,354,442 B2 | 6/2022 | Haldenby et al. |
| 11,361,566 B2 | 6/2022 | Collinson et al. |
| 11,373,229 B2 | 6/2022 | Tseretopoulos et al. |
| 11,385,892 B1 | 7/2022 | Zhang |
| 11,392,776 B2 | 7/2022 | Lozon et al. |
| 11,393,020 B2 | 7/2022 | Mathew et al. |
| 11,394,668 B1 | 7/2022 | Subbunarayanan et al. |
| 11,397,765 B2 | 7/2022 | Volkovs et al. |
| 11,409,811 B2 | 8/2022 | D'Agostino |
| 11,411,734 B2 | 8/2022 | Shpurov et al. |
| 11,416,245 B2 | 8/2022 | Irvin et al. |
| 11,429,360 B1 | 8/2022 | Agarwal et al. |
| 11,430,242 B2 | 8/2022 | Moghtadai |
| 11,436,809 B2 | 9/2022 | Rizvi et al. |
| 11,443,082 B2 | 9/2022 | Janarthanam et al. |
| 11,451,669 B1 | 9/2022 | Navarro et al. |
| 11,469,878 B2 | 10/2022 | Shpurov et al. |
| 11,470,091 B2 | 10/2022 | McCarter et al. |
| 11,470,143 B2 | 10/2022 | Joheb et al. |
| 11,475,059 B2 | 10/2022 | Liu et al. |
| 11,475,251 B2 | 10/2022 | Morin et al. |
| 11,477,265 B2 | 10/2022 | McPhee et al. |
| 11,507,622 B2 | 11/2022 | Grebenisan et al. |
| 11,507,868 B2 | 11/2022 | Kwong et al. |
| 11,537,492 B1 | 12/2022 | Agarwal et al. |
| 11,546,345 B2 | 1/2023 | D'Agostino et al. |
| 11,550,652 B1 | 1/2023 | Arora et al. |
| 11,580,762 B2 | 2/2023 | Rizvi et al. |
| 11,586,491 B2 | 2/2023 | Banerjee et al. |
| 11,593,461 B2 | 2/2023 | Polisetty et al. |
| 11,599,444 B2 | 3/2023 | Lin et al. |
| 11,600,064 B2 | 3/2023 | Navarro et al. |
| 11,604,899 B2 | 3/2023 | Haldenby et al. |
| 11,620,741 B2 | 4/2023 | Kuruvilla et al. |
| 11,632,311 B2 | 4/2023 | Miller et al. |
| 11,651,100 B2 | 5/2023 | Dunjic et al. |
| 11,663,488 B2 | 5/2023 | Volkovs et al. |
| 11,669,436 B2 | 6/2023 | Ingram |
| 11,671,536 B2 | 6/2023 | Navarro et al. |
| 11,675,654 B2 | 6/2023 | Pudipeddi et al. |
| 11,676,016 B2 | 6/2023 | Baijal et al. |
| 11,681,541 B2 | 6/2023 | Mostafa |
| 11,687,995 B2 | 6/2023 | Tseretopoulos et al. |
| 11,689,484 B2 | 6/2023 | Moon et al. |
| 11,693,632 B2 | 7/2023 | Latapie et al. |
| 11,704,782 B2 | 7/2023 | Wakim et al. |
| 11,741,305 B2 | 8/2023 | Skaljin et al. |
| 11,743,210 B2 | 8/2023 | Moon et al. |
| 11,748,400 B2 | 9/2023 | Volkovs et al. |
| 11,748,555 B2 | 9/2023 | Tran |
| 11,756,388 B2 | 9/2023 | Pratten et al. |
| 11,777,918 B2 | 10/2023 | Moon et al. |
| 11,782,935 B2 | 10/2023 | Caputo et al. |
| 11,789,909 B2 | 10/2023 | Grebenisan et al. |
| 11,790,012 B2 | 10/2023 | D'Agostino |
| 11,790,354 B2 | 10/2023 | Gandhi et al. |
| 11,797,962 B2 | 10/2023 | Jones et al. |
| 11,809,486 B2 | 11/2023 | Liu et al. |
| 11,809,577 B2 | 11/2023 | Begg et al. |
| 11,811,826 B2 | 11/2023 | Moon et al. |
| 11,816,474 B1 | 11/2023 | Zafar et al. |
| 11,830,463 B1 | 11/2023 | Kurek et al. |
| 11,842,252 B2 | 12/2023 | Kuang et al. |
| 11,868,672 B1 | 1/2024 | Dehkordi et al. |
| 11,875,398 B2 | 1/2024 | Pratten et al. |
| 11,880,811 B2 | 1/2024 | Pawelkiewicz et al. |
| 11,886,764 B2 | 1/2024 | Lam |
| 11,928,112 B2 | 3/2024 | Dunjic et al. |
| 11,941,378 B2 | 3/2024 | Adler et al. |
| 11,941,525 B2 | 3/2024 | Morin et al. |
| 11,941,703 B2 | 3/2024 | Kuruvilla et al. |
| 11,955,117 B2 | 4/2024 | McDermid et al. |
| 11,960,867 B1 | 4/2024 | Singh et al. |
| 11,966,491 B2 | 4/2024 | D'Agostino |
| 11,978,085 B2 | 5/2024 | Rai et al. |
| 11,978,090 B2 | 5/2024 | Navarro et al. |
| 11,985,153 B2 | 5/2024 | Karl |
| 11,995,121 B2 | 5/2024 | Volkovs et al. |
| 12,008,315 B2 | 6/2024 | Miller et al. |
| 12,014,303 B2 | 6/2024 | Carvalho et al. |
| 12,019,594 B2 | 6/2024 | Floyd et al. |

(56) References Cited

U.S. PATENT DOCUMENTS

| | | |
|---|---|---|
| 12,021,874 B2 | 6/2024 | Dunjic et al. |
| 12,039,535 B2 | 7/2024 | Dunjic et al. |
| 12,052,363 B2 | 7/2024 | Shpurov et al. |
| 12,061,652 B2 | 8/2024 | Miller et al. |
| 12,067,130 B2 | 8/2024 | Shpurov et al. |
| 12,067,580 B2 | 8/2024 | Jeske et al. |
| 12,079,351 B2 | 9/2024 | Begg et al. |
| 12,106,220 B2 | 10/2024 | Volkovs et al. |
| 12,111,793 B2 | 10/2024 | Grebenisan et al. |
| 12,124,925 B2 | 10/2024 | Rho et al. |
| 12,136,079 B2 | 11/2024 | Jones et al. |
| 12,158,929 B1 | 12/2024 | Huang et al. |
| 12,164,542 B1 | 12/2024 | Rahman et al. |
| 12,164,751 B1 | 12/2024 | Harper et al. |
| 12,169,693 B2 | 12/2024 | Lu |
| 12,174,734 B2 | 12/2024 | Ziegler et al. |
| 12,175,220 B2 | 12/2024 | Sundaresan et al. |
| 12,182,263 B2 | 12/2024 | Sinn et al. |
| 12,182,678 B1 | 12/2024 | Poulis et al. |
| 12,182,800 B2 | 12/2024 | Navarro et al. |
| 12,198,109 B2 | 1/2025 | Abbas |
| 12,198,510 B2 | 1/2025 | Pratten et al. |
| 12,204,323 B1 | 1/2025 | Malviya et al. |
| 12,210,534 B2 | 1/2025 | Cashion et al. |
| 12,211,274 B2 | 1/2025 | Ma et al. |
| 12,217,011 B2 | 2/2025 | Luo et al. |
| 12,223,456 B1 | 2/2025 | Manohar et al. |
| 12,223,549 B2 | 2/2025 | Bouëttéet al. |
| 12,229,690 B2 | 2/2025 | Stanevich et al. |
| 12,254,512 B2 | 3/2025 | Heglin et al. |
| 12,282,785 B2 | 4/2025 | Karbasi et al. |
| 12,288,236 B2 | 4/2025 | Volkovs et al. |
| 12,299,149 B2 | 5/2025 | Nikoghossian et al. |
| 12,316,715 B2 | 5/2025 | Taheri et al. |
| 12,321,861 B2 | 6/2025 | Volkovs et al. |
| 12,326,856 B2 | 6/2025 | Mohammed et al. |
| 12,333,354 B2 | 6/2025 | Mohammed et al. |
| 12,353,969 B2 | 7/2025 | Kuang et al. |
| 12,354,094 B2 | 7/2025 | Jones et al. |
| 12,373,795 B2 | 7/2025 | Misler et al. |
| 2007/0061354 A1 | 3/2007 | Sarkar et al. |
| 2009/0064205 A1 | 3/2009 | Fay et al. |
| 2015/0082272 A1 | 3/2015 | Jalaldeen et al. |
| 2018/0150378 A1 | 5/2018 | Gopalswamy et al. |
| 2018/0268818 A1 | 9/2018 | Schoenmackers et al. |
| 2018/0349105 A1 | 12/2018 | Makkar |
| 2019/0172045 A1 | 6/2019 | Dunjic et al. |
| 2019/0272171 A1 | 9/2019 | Chen et al. |
| 2019/0303107 A1 | 10/2019 | Kelly |
| 2020/0058068 A1 | 2/2020 | Gandhi et al. |
| 2020/0159643 A1 | 5/2020 | Wang et al. |
| 2020/0159934 A1 | 5/2020 | Yamaguchi et al. |
| 2020/0371778 A1 | 11/2020 | Ni et al. |
| 2021/0026605 A1 | 1/2021 | Evangelopoulos et al. |
| 2021/0027160 A1 | 1/2021 | Volkovs et al. |
| 2021/0034342 A1 | 2/2021 | Hoy |
| 2021/0037040 A1 | 2/2021 | Aleks et al. |
| 2021/0049007 A1 | 2/2021 | Nelluri et al. |
| 2021/0056007 A1 | 2/2021 | Viswanathan et al. |
| 2021/0117893 A1 | 4/2021 | Sohum et al. |
| 2021/0132915 A1 | 5/2021 | Ivankovic et al. |
| 2021/0232950 A1 | 7/2021 | Kono |
| 2021/0264461 A1 | 8/2021 | Fam |
| 2021/0334096 A1 | 10/2021 | DeLuca et al. |
| 2021/0334700 A1 | 10/2021 | Nagaraja |
| 2021/0374304 A1 | 12/2021 | Janarthanam et al. |
| 2021/0390656 A1 | 12/2021 | Krishnamoorthy |
| 2021/0407016 A1 | 12/2021 | Kuruvilla et al. |
| 2022/0035856 A1 | 2/2022 | Gilder et al. |
| 2022/0058489 A1 | 2/2022 | Volkovs et al. |
| 2022/0107980 A1 | 4/2022 | Lisuk et al. |
| 2022/0108069 A1 | 4/2022 | Lee |
| 2022/0157094 A1 | 5/2022 | Moghtadai et al. |
| 2022/0164626 A1 | 5/2022 | Bird et al. |
| 2022/0164672 A1 | 5/2022 | Bird et al. |
| 2022/0172083 A1 | 6/2022 | Wu et al. |
| 2022/0188079 A1 | 6/2022 | Kohisseri et al. |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0309573 A1 | 9/2022 | Mathew et al. |
| 2022/0318500 A1 | 10/2022 | Prasad et al. |
| 2022/0318573 A1 | 10/2022 | Smith et al. |
| 2022/0318617 A1 | 10/2022 | Wong et al. |
| 2022/0318682 A1 | 10/2022 | Sawaf et al. |
| 2022/0318683 A1 | 10/2022 | Sawaf et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0034984 A1 | 2/2023 | Ravindranath et al. |
| 2023/0048437 A1 | 2/2023 | Karbasi et al. |
| 2023/0083899 A1 | 3/2023 | Gandouet et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0161561 A1 | 5/2023 | Ghosh et al. |
| 2023/0185550 A1 | 6/2023 | Saphal et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267034 A1 | 8/2023 | Arumugam et al. |
| 2023/0267367 A1 | 8/2023 | Volkovs et al. |
| 2023/0267475 A1 | 8/2023 | Navarro et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0360388 A1 | 11/2023 | Singh |
| 2023/0368048 A1 | 11/2023 | Yang et al. |
| 2023/0377047 A1 | 11/2023 | Bouëttéet al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |

(56) References Cited

U.S. PATENT DOCUMENTS

| | | |
|---|---|---|
| 2024/0062117 A1 | 2/2024 | Kuang et al. |
| 2024/0069871 A1 | 2/2024 | Mohanty et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0176808 A1 | 5/2024 | Das et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281219 A1 | 8/2024 | Masad et al. |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0362209 A1 | 10/2024 | Almaer et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403623 A1 | 12/2024 | Mohamed Halim et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419575 A1 | 12/2024 | Hawker |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0424405 A1 | 12/2024 | Rao et al. |
| 2024/0427564 A1 | 12/2024 | Petrov et al. |
| 2024/0427566 A1 | 12/2024 | Lin et al. |
| 2024/0428283 A1 | 12/2024 | Belbahri et al. |
| 2024/0430363 A1 | 12/2024 | Neate et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0021309 A1 | 1/2025 | Schmidt et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045028 A1 | 2/2025 | Sikand et al. |
| 2025/0045048 A1 | 2/2025 | Dey et al. |
| 2025/0045530 A1 | 2/2025 | Reddy et al. |
| 2025/0045601 A1 | 2/2025 | Zuberi et al. |
| 2025/0053387 A1 | 2/2025 | Wang et al. |
| 2025/0053799 A1 | 2/2025 | Rastogi et al. |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |
| 2025/0077400 A1 | 3/2025 | Sen |
| 2025/0077556 A1 | 3/2025 | Guttridge et al. |
| 2025/0077681 A1 | 3/2025 | Sen |
| 2025/0077682 A1 | 3/2025 | Guttridge et al. |
| 2025/0077939 A1 | 3/2025 | Tabatabaei et al. |
| 2025/0078324 A1 | 3/2025 | Gormley |
| 2025/0078325 A1 | 3/2025 | Gormley |
| 2025/0078344 A1 | 3/2025 | Gormley |
| 2025/0078345 A1 | 3/2025 | Gormley |
| 2025/0078972 A1 | 3/2025 | Gormley |
| 2025/0085936 A1 | 3/2025 | Guttridge et al. |
| 2025/0086096 A1 | 3/2025 | Guttridge et al. |
| 2025/0086440 A1 | 3/2025 | Erb et al. |
| 2025/0086441 A1 | 3/2025 | Guttridge et al. |
| 2025/0086451 A1 | 3/2025 | Guttridge et al. |
| 2025/0086551 A1 | 3/2025 | Zhao |
| 2025/0094437 A1 | 3/2025 | Upendran |
| 2025/0103609 A1 | 3/2025 | Upendran |
| 2025/0103961 A1 | 3/2025 | Cresswell et al. |
| 2025/0103980 A1 | 3/2025 | Deljavan Farshi et al. |
| 2025/0104024 A1 | 3/2025 | Abbas |
| 2025/0104029 A1 | 3/2025 | Deljavan Farshi et al. |
| 2025/0104047 A1 | 3/2025 | Mashkevich |
| 2025/0104050 A1 | 3/2025 | Mashkevich |
| 2025/0104059 A1 | 3/2025 | Mashkevich |
| 2025/0104074 A1 | 3/2025 | Tsang et al. |
| 2025/0104306 A1 | 3/2025 | Mashkevich |
| 2025/0104700 A1 | 3/2025 | Henault-Ethier et al. |
| 2025/0106060 A1 | 3/2025 | Gormley et al. |
| 2025/0106201 A1 | 3/2025 | Gormley |
| 2025/0110805 A1 | 4/2025 | Starszyk et al. |
| 2025/0117411 A1 | 4/2025 | Mohammed |
| 2025/0117595 A1 | 4/2025 | Taheri |
| 2025/0117596 A1 | 4/2025 | Taheri |
| 2025/0117623 A1 | 4/2025 | Devarajan et al. |
| 2025/0117629 A1 | 4/2025 | Pandey et al. |
| 2025/0117630 A1 | 4/2025 | Taheri |
| 2025/0117769 A1 | 4/2025 | Taheri |
| 2025/0117836 A1 | 4/2025 | Taheri et al. |
| 2025/0117853 A1 | 4/2025 | Pandey et al. |
| 2025/0117854 A1 | 4/2025 | Pandey et al. |
| 2025/0117855 A1 | 4/2025 | Pandey et al. |
| 2025/0117856 A1 | 4/2025 | Pandey et al. |
| 2025/0119396 A1 | 4/2025 | Taheri |
| 2025/0119494 A1 | 4/2025 | Pandey et al. |
| 2025/0119495 A1 | 4/2025 | Pandey et al. |
| 2025/0124039 A1 | 4/2025 | Cashion et al. |
| 2025/0124240 A1 | 4/2025 | Luo et al. |
| 2025/0131718 A1 | 4/2025 | Ma et al. |
| 2025/0138838 A1 | 5/2025 | Ramesh et al. |
| 2025/0139267 A1 | 5/2025 | Zykh et al. |
| 2025/0139382 A1 | 5/2025 | Mohammed et al. |
| 2025/0139708 A1 | 5/2025 | Bouëttéet al. |
| 2025/0147733 A1 | 5/2025 | Abbas et al. |
| 2025/0148321 A1 | 5/2025 | Stanevich et al. |
| 2025/0165375 A1 | 5/2025 | Cresswell et al. |
| 2025/0165866 A1 | 5/2025 | Cresswell et al. |
| 2025/0173170 A1 | 5/2025 | Glynn-Udrow et al. |
| 2025/0173568 A1 | 5/2025 | Cresswell et al. |
| 2025/0173618 A1 | 5/2025 | Cresswell et al. |
| 2025/0173619 A1 | 5/2025 | Cresswell et al. |
| 2025/0173725 A1 | 5/2025 | Devarajan et al. |
| 2025/0181321 A1 | 6/2025 | Gormley |
| 2025/0182028 A1 | 6/2025 | Gormley |
| 2025/0182196 A1 | 6/2025 | Gormley |
| 2025/0182222 A1 | 6/2025 | Gormley |
| 2025/0191062 A1 | 6/2025 | Heglin et al. |
| 2025/0217175 A1 | 7/2025 | Karbasi et al. |
| 2025/0225560 A1 | 7/2025 | Bajaj et al. |

(56)            References Cited

U.S. PATENT DOCUMENTS

| | | |
|---|---|---|
| 2025/0231668 A1 | 7/2025 | Tao et al. |
| 2025/0231750 A1 | 7/2025 | Lim et al. |
| 2025/0231774 A1 | 7/2025 | Tao et al. |
| 2025/0231775 A1 | 7/2025 | Tao et al. |
| 2025/0231793 A1 | 7/2025 | Lim et al. |
| 2025/0232130 A1 | 7/2025 | Tao et al. |
| 2025/0232351 A1 | 7/2025 | Tao et al. |
| 2025/0232375 A1 | 7/2025 | Tao et al. |
| 2025/0232376 A1 | 7/2025 | Tao et al. |
| 2025/0232377 A1 | 7/2025 | Tao et al. |
| 2025/0232503 A1 | 7/2025 | Lim et al. |
| 2025/0238536 A1 | 7/2025 | Nikoghossian et al. |
| 2025/0245071 A1 | 7/2025 | Ionescu et al. |
| 2025/0245511 A1 | 7/2025 | D'Agostino et al. |

OTHER PUBLICATIONS

Ivers et al., "Can AI Close the Design-Code Abstraction Gap?", 2019, IEEE, pp. 122-125. (Year: 2019).*

Schumacher et al., "Improving Code Recommendations by Combining Neural and Classical Machine Learning Approaches", 2020, ACM, pp. 476-482. (Year: 2020).*

Adebayo et al., "Automated Compliance Blueprint Optimization with Artificial Intelligence", 2022, arXiv, 5 pages. (Year: 2022).*

Heglin et al., "Auto-Adjudication Process Via Machine Learning," U.S. Appl. No. 19/053,942, filed Feb. 14, 2025.

Heidrich et al., "Visualizing Source Code as Comics Using Generative AI", IEEE, pp. 1-5 (Year: 2023).

Santos et al., "Impacts of the Usage of Generative Artificial Intelligence on Software Development Process", ACM, pp. 1-9 (Year: 2024).

Arun, "A Software Architectural Model for Generative Artificial Intelligence with Reinforcement Learning", IEEE, pp. 1-6 (Year: 2024).

He et al, "Securing Federated Diffusion Model With Dynamic Quantization for Generative AI Services in Multiple-Access Artificial Intelligence of Things", IEEE, pp. 1-14 (Year: 2024).

Zhang et al, "Application Research on Artificial Intelligence Generated Content in Architectural Design", ACM, pp. 1-10 (Year: 2024).

Stanislaw Jerzy Niepostyn, Entropy as a Measure of Consistency in Software Architecture, 2023, pp. 1-21. https://www.mdpi.com/1099-4300/25/2/328 (Year: 2023).

Qiang Tu et al.; The Build-Time Software Architecture View; IEEE; 10 pages; retrieve on Sep. 29, 2025 (Year: 2025).

Banus et al., "Design and Deployment of a Generic Software for Managing Industrial Vision Systems", IEEE Transactions on Automation Science and Engineering, pp. 2171-2184, Jul. 2022. https://ieeexplore.ieee.org/stamp/stamp.jsp?tp=&amumber-9445397 (Year: 2022).

Bao et al., "Software Architecture for Responsible Artificial Intelligence Systems: Practice in the Digitization of Industrial Drawings," IEEE Xplore, pp. 38-49, (2023) https://ieeexplore.ieee.org/stamp/stamp.jsp?tp=&amumber= 10098222.

* cited by examiner

Figure 5B:
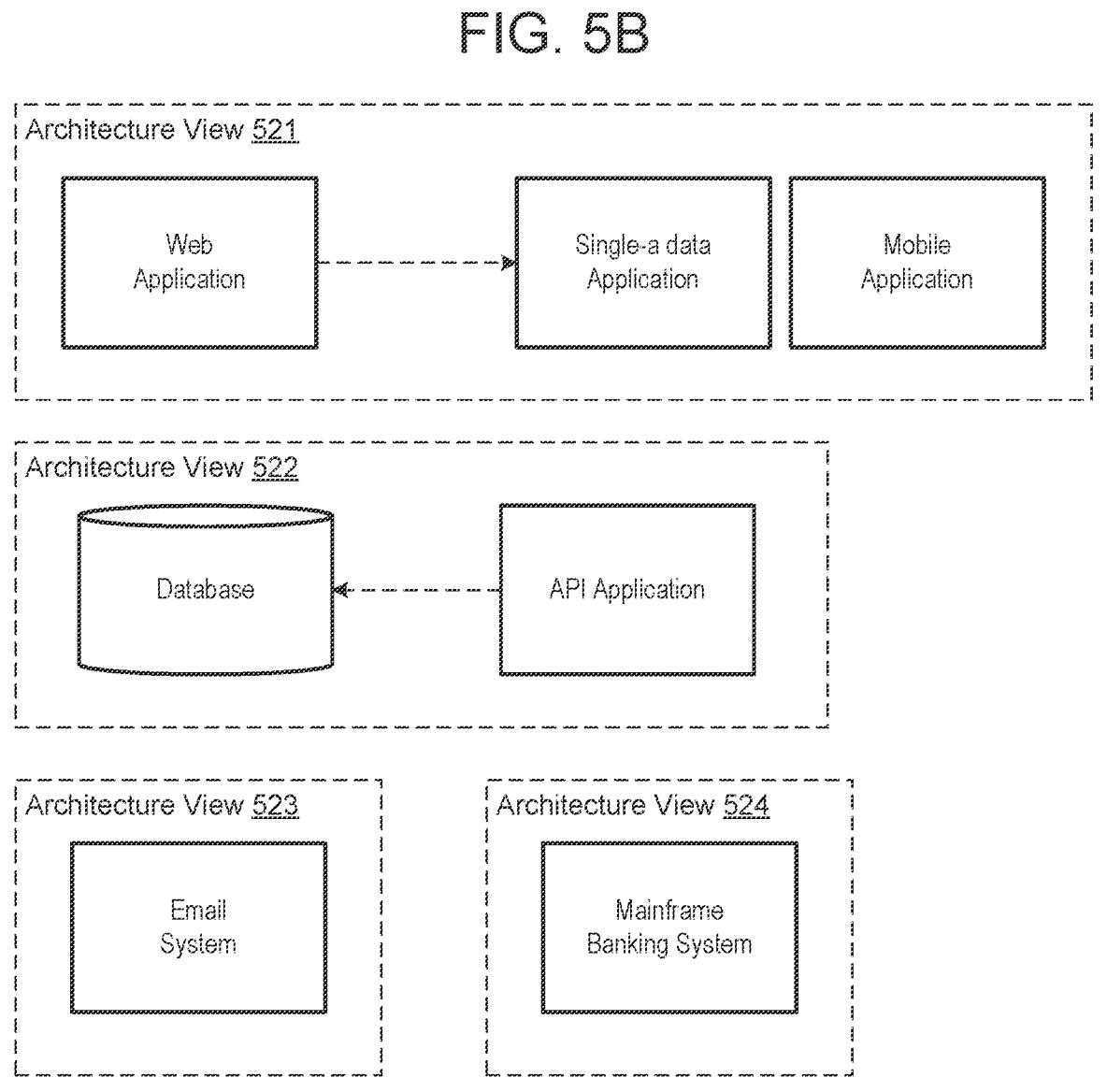

Architecture View 521

Web
Application

Single-a data
Application

Mobile
Application

Architecture View 522

Database

API Application

Architecture View 523

Email
System

Architecture View 524

Mainframe
Banking System

FIG. 6

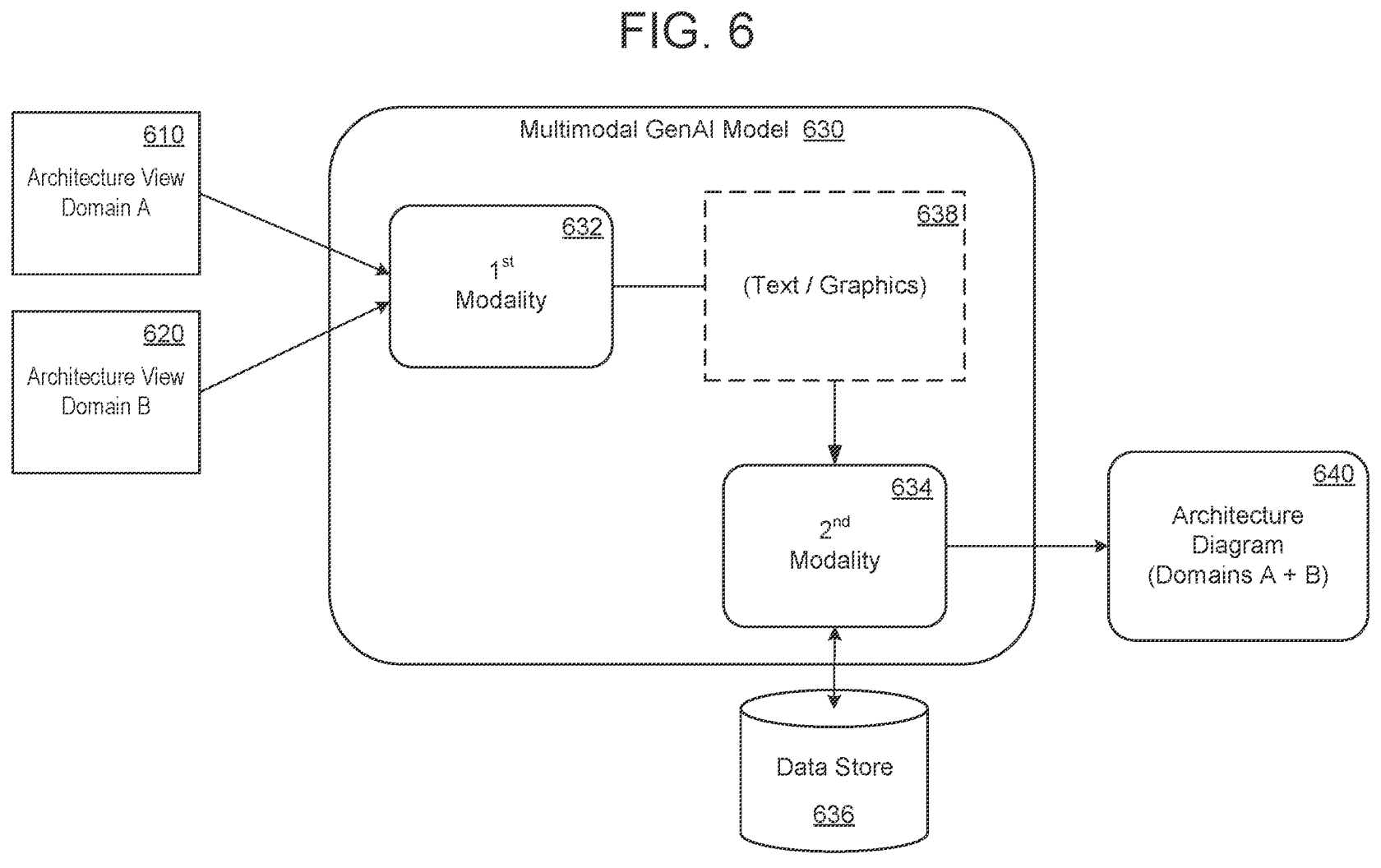

Architecture View
Domain A
610

Architecture View
Domain B
620

Multimodal GenAI Model  630

1st
Modality
632

(Text / Graphics)
638

2nd
Modality
634

Data Store
636

Architecture
Diagram
(Domains A + B)
640

700

730

1000                    FIG. 10A
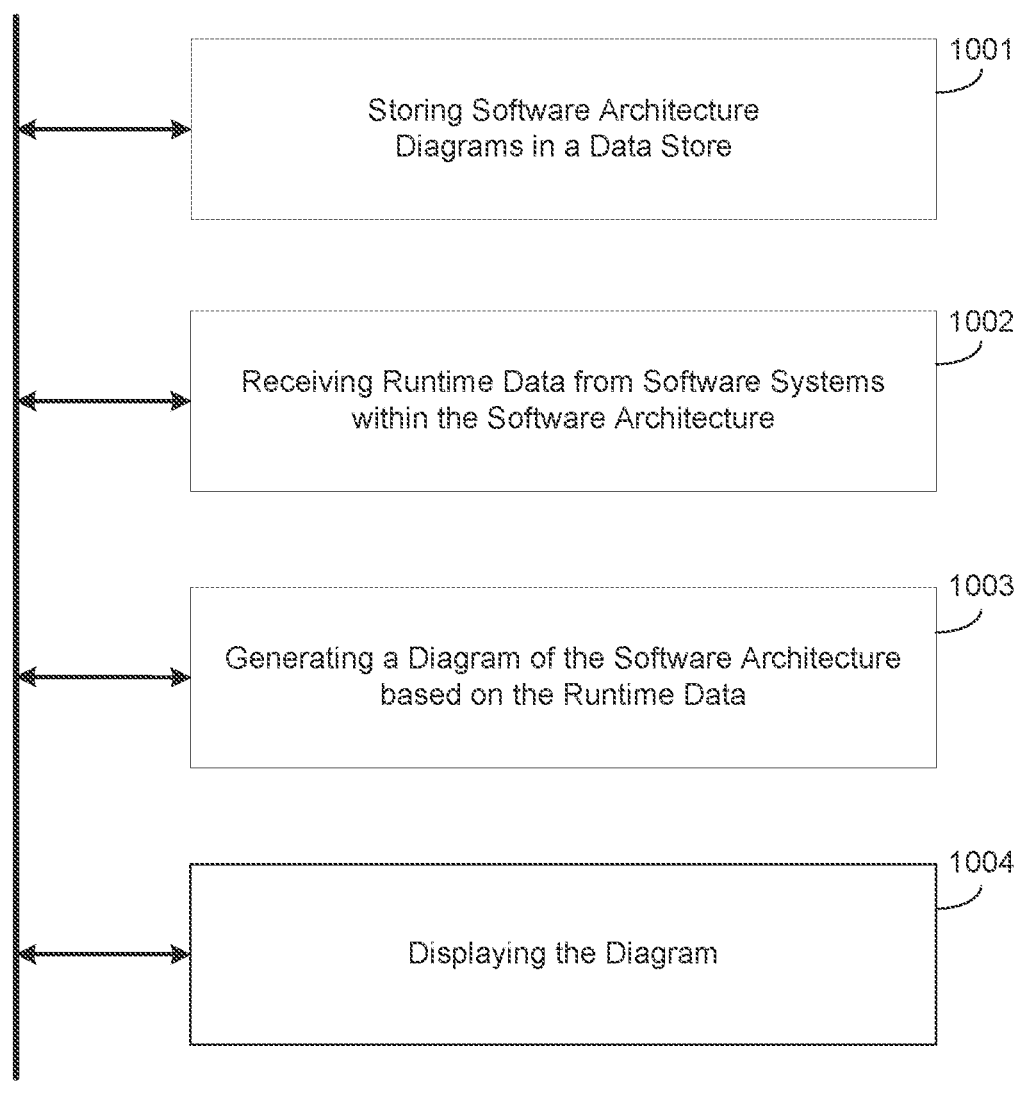

1010

Training a GenAI Model on Software Architecture
Documents and Descriptions
1011

Receiving a Plurality of Architecture Views
of a Plurality of Domains of a Software Architecture
1012

Generating an Architecture Diagram of the Plurality of
Domains based on the Plurality of Views
1013

Displaying the Architecture Diagram
1014

1020                    FIG. 10C
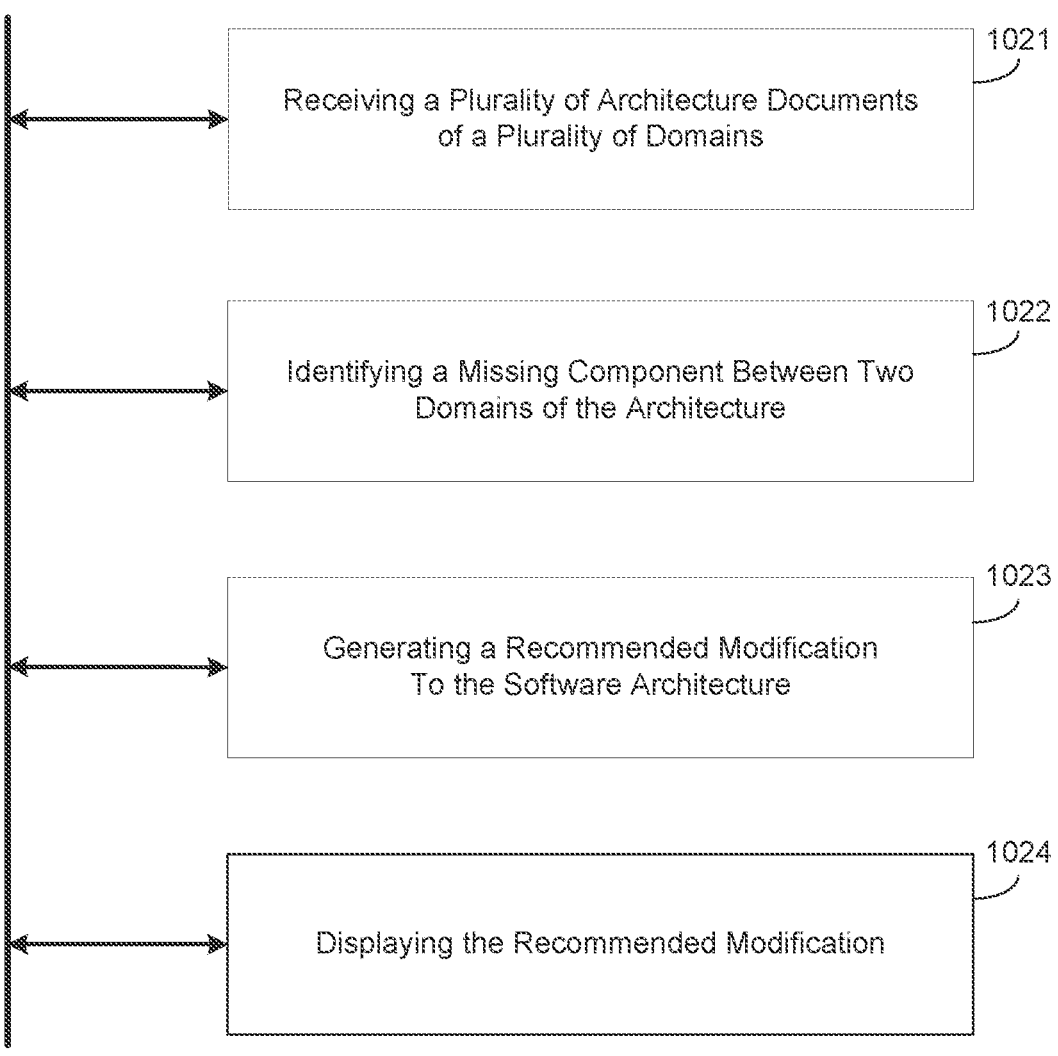
1021
Receiving a Plurality of Architecture Documents
of a Plurality of Domains
1022
Identifying a Missing Component Between Two
Domains of the Architecture
1023
Generating a Recommended Modification
To the Software Architecture
1024
Displaying the Recommended Modification

1030

Training a GenAI Model based on Architecture Diagrams and Descriptions — 1031

Displaying One or More Prompts — 1032

Receiving One or More Natural Language Responses — 1033

Generating a Text-Based Response based on the GenAI Model and the Prompts and Responses — 1034

Displaying the Text-Based Response — 1035

1040                    FIG. 10E

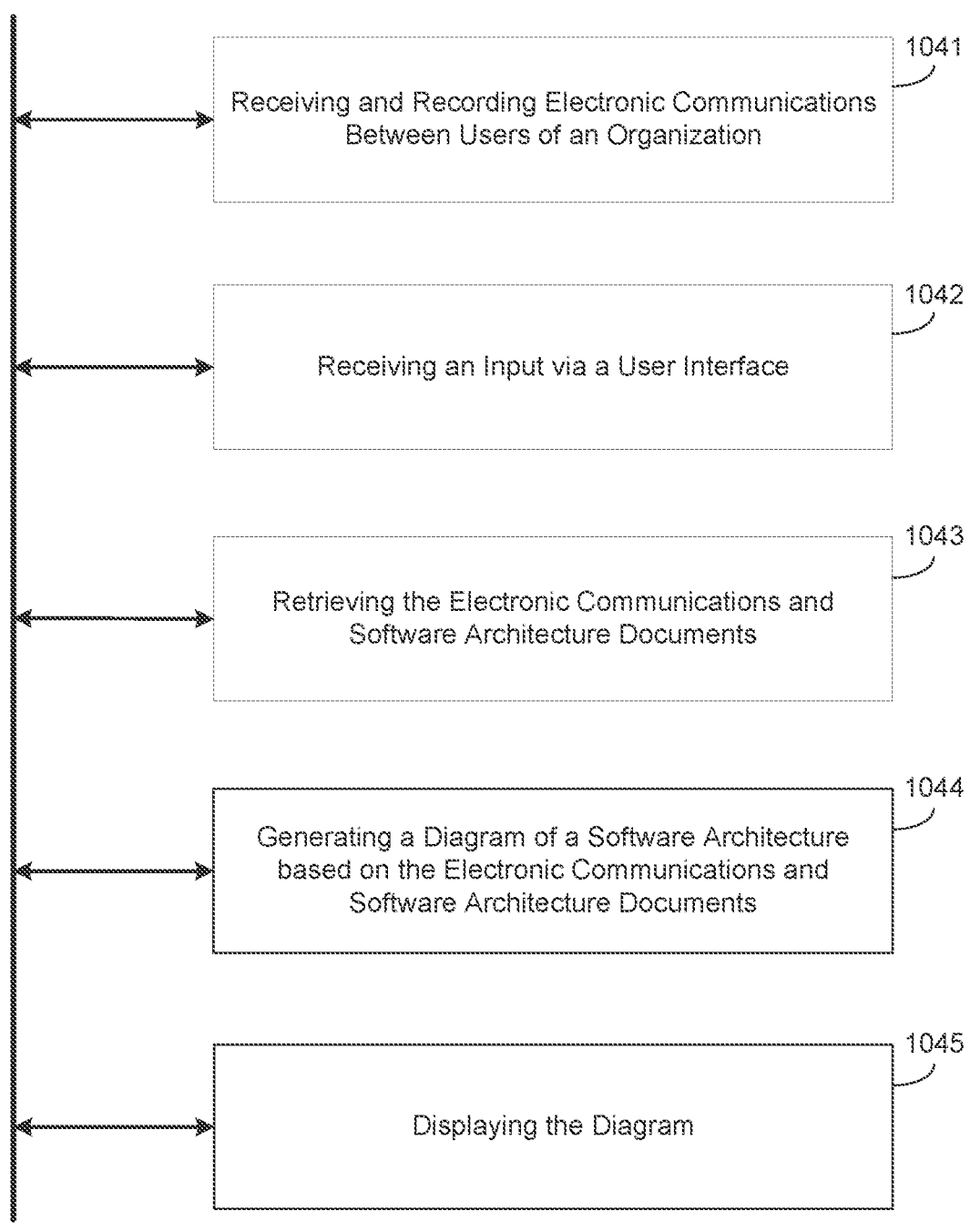

1041

Receiving and Recording Electronic Communications Between Users of an Organization

1042

Receiving an Input via a User Interface

1043

Retrieving the Electronic Communications and Software Architecture Documents

1044

Generating a Diagram of a Software Architecture based on the Electronic Communications and Software Architecture Documents

1045

Displaying the Diagram

1100         FIG. 11
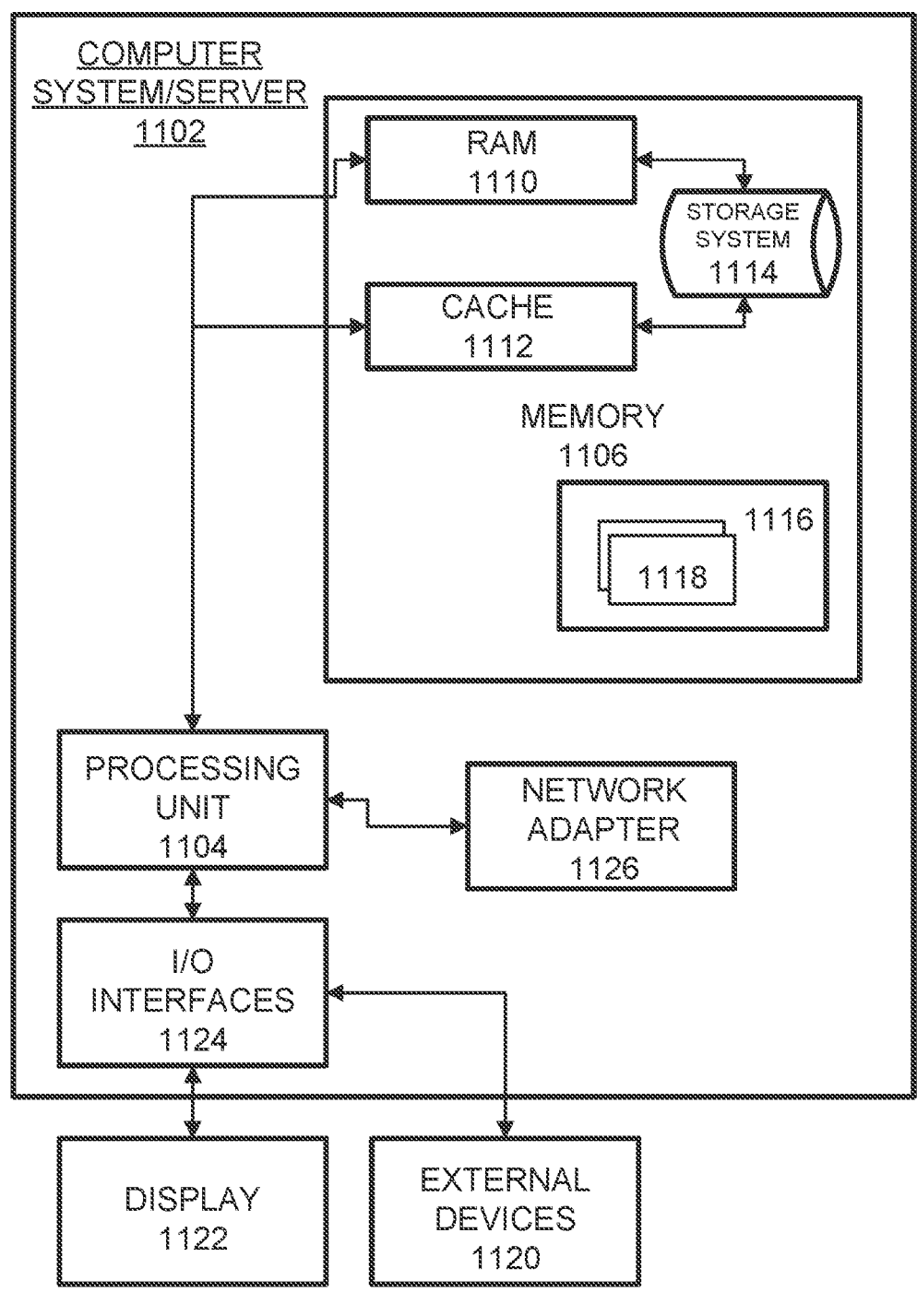

GAP IDENTIFICATION AND SOLUTION RECOMMENDATION FOR COMPLEX SOFTWARE ARCHITECTURE

BACKGROUND

For large companies and organizations, the number of software architects can be in the dozens or even hundreds. The architects often work inside a siloed environment outside of a larger software architecture ecosystem of the organization. For example, a first software architect may organize and manage an email software system, while a second software architect may manage a database software system. In this example, these architects may be unaware of the software architecture of the other and of the others in the larger ecosystem.

Furthermore, external audits are often performed by external users of an organization that verify licensing rights and identify compliance gaps. These audits are aided significantly by drawings of the architecture. However, these diagrams are often not made by the architect or not completed with enough current information to fully understand the software system as it currently is in real-time.

SUMMARY

One example embodiment provides an apparatus that may include a data store configured to store software architecture diagrams, and a processor configured to receive runtime data from a plurality of different software systems within a software architecture, the runtime data comprising descriptions of events that occur during runtime between the different software systems of the software architecture, generate a diagram of the software architecture based on execution of a multi-modal generative artificial intelligence (GenAI) model on the runtime data and the stored software architecture diagrams in the data store, and display the diagram of the software architecture via a user interface.

Another example embodiment provides a method that includes one or more of storing software architecture diagrams in a data store, receiving runtime data from a plurality of different software systems within a software architecture, the runtime data comprising descriptions of events that occur during runtime between the different software systems of the software architecture, generating a diagram of the software architecture based on execution of a multi-modal generative artificial intelligence (GenAI) model on the runtime data and the software architecture diagrams stored in the data store, and displaying the diagram of the software architecture via a user interface.

A further example embodiment provides a computer-readable medium comprising instructions, that when read by a processor, cause the processor to perform one or more of storing software architecture diagrams in a data store, receiving runtime data from a plurality of different software systems within a software architecture, the runtime data comprising descriptions of events that occur during runtime between the different software systems of the software architecture, generating a diagram of the software architecture based on execution of a multi-modal generative artificial intelligence (GenAI) model on the runtime data and the software architecture diagrams stored in the data store, and displaying the diagram of the software architecture via a user interface.

One example embodiment provides an apparatus that may include a data store comprising descriptions and diagrams of a software architecture, and a processor configured to train a generative artificial intelligence (GenAI) model via execution of the GenAI model on descriptions and diagrams of a software architecture, receive a plurality of different architecture views from a plurality of different domains of the software architecture, generate an architecture diagram of the plurality of domains of the software architecture in combination based on execution of the GenAI model on the plurality of different architecture views from the plurality of different domains, and display the architecture diagram of the plurality of domains of the software architecture via a user interface.

Another example embodiment provides a method that includes one or more of training a generative artificial intelligence (GenAI) model via execution of the GenAI model on descriptions and diagrams of a software architecture, receiving a plurality of different architecture views from a plurality of different domains of the software architecture, generating an architecture diagram of the plurality of domains of the software architecture in combination based on execution of the GenAI model on the plurality of different architecture views from the plurality of different domains, and displaying the architecture diagram of the plurality of domains of the software architecture via a user interface.

A further example embodiment provides a computer-readable medium comprising instructions, that when read by a processor, cause the processor to perform one or more of training a generative artificial intelligence (GenAI) model via execution of the GenAI model on descriptions and diagrams of a software architecture, receiving a plurality of different architecture views from a plurality of different domains of the software architecture, generating an architecture diagram of the plurality of domains of the software architecture in combination based on execution of the GenAI model on the plurality of different architecture views from the plurality of different domains, and displaying the architecture diagram of the plurality of domains of the software architecture via a user interface.

One example embodiment provides an apparatus that may include a processor configured to receive a plurality of architecture documents of a plurality of different domains of a software architecture, identify a missing component that is missing from within the software architecture between a first domain and a second domain among the plurality of domains based on execution of a generative artificial intelligence (GenAI) model on the plurality of architecture documents of the software architecture, generate a recommended modification to the software architecture based on the identified missing component, and display the recommended modification via a user interface.

Another example embodiment provides a method that includes one or more of receiving a plurality of architecture documents of a plurality of different domains of a software architecture, identifying a missing component that is missing from within the software architecture between a first domain and a second domain among the plurality of domains based on execution of a generative artificial intelligence (GenAI) model based on the plurality of architecture documents of the software architecture, generating a recommended modification to the software architecture based on the identified missing component, and displaying the recommended modification via a user interface.

A further example embodiment provides a computer-readable medium comprising instructions, that when read by a processor, cause the processor to perform one or more of receiving a plurality of architecture documents of a plurality of different domains of a software architecture, identifying a missing component that is missing from within the software architecture between a first domain and a second domain among the plurality of domains based on execution of a generative artificial intelligence (GenAI) model based on the plurality of architecture documents of the software architecture, generating a recommended modification to the software architecture based on the identified missing component, and displaying the recommended modification via a user interface.

A further example embodiment provides an apparatus that may include a processor configured to train a generative artificial intelligence (GenAI) model based on architecture diagrams of a software architecture and descriptions of the architecture diagrams, display one or more prompts on a user interface, receive one or more natural language responses associated with the software architecture in response to the one or more prompts, generate a text-based response to the natural language query submitted via the user interface based on execution of the GenAI model on the one or more prompts and the one or more natural language responses associated with the software architecture, and display the text-based response via the user interface.

A further example embodiment provides a method that includes one or more of training a generative artificial intelligence (GenAI) model based on architecture diagrams of a software architecture and descriptions of the architecture diagrams, displaying one or more prompts on a user interface, receiving one or more natural language responses associated with the software architecture in response to the one or more prompts, generating a text-based response to the natural language query submitted via the user interface based on execution of the GenAI model on the one or more prompts and the one or more natural language responses associated with the software architecture, and displaying the text-based response via the user interface.

A further example embodiment provides a computer-readable medium comprising instructions, that when read by a processor, cause the processor to perform one or more of training a generative artificial intelligence (GenAI) model based on architecture diagrams of a software architecture and descriptions of the architecture diagrams, displaying one or more prompts on a user interface, receiving one or more natural language responses associated with the software architecture in response to the one or more prompts, generating a text-based response to the natural language query submitted via the user interface based on execution of the GenAI model on the one or more prompts and the one or more natural language responses associated with the software architecture, and displaying the text-based response via the user interface.

A further example embodiment provides an apparatus that may include a data store comprising software architecture documents, and a processor configured to receive and record electronic communications that occur between users of an organization within the data store, receive an input via a user interface, retrieve the electronic communications of the organization and software architecture documents from the data store in response to receipt of the input, generate a diagram of a software architecture of the organization based on execution of a generative artificial intelligence (GenAI) model on the electronic communications of the organization and the software architecture documents, and display the diagram of the software architecture via a user interface.

A further example embodiment provides a method that includes one or more of receiving and recording electronic communications that occur between users of an organization within a data store, receiving an input via a user interface, retrieving the electronic communications of the organization and software architecture documents from the data store in response to receipt of the input, generating a diagram of a software architecture of the organization based on execution of a generative artificial intelligence (GenAI) model on the electronic communications of the organization and the software architecture documents, and displaying the diagram of the software architecture via a user interface.

A further example embodiment provides a computer-readable medium comprising instructions, that when read by a processor, cause the processor to perform one or more of receiving and recording electronic communications that occur between users of an organization within a data store, receiving an input via a user interface, retrieving the electronic communications of the organization and software architecture documents from the data store in response to receipt of the input, generating a diagram of a software architecture of the organization based on execution of a generative artificial intelligence (GenAI) model on the electronic communications of the organization and the software architecture documents, and displaying the diagram of the software architecture via a user interface.

BRIEF DESCRIPTION OF THE DRAWINGS

FIGS. 3A-3C are diagrams illustrating processes for training a machine learning model according to example embodiments.

FIGS. 5A-5D are diagrams illustrating a process of generating a complex architecture diagram from a plurality of architecture views according to example embodiments.

FIG. 6 is a diagram illustrating an example of a multimodal generative artificial intelligence model according to example embodiments.

FIG. 10A is a diagram illustrating a method of generating a real-time diagram of a software architecture according to example embodiments.

FIG. 10C is a diagram illustrating a method of identifying gaps in a software architecture according to example embodiments.

FIG. 10E is a diagram illustrating a method of generating a diagram of a software architecture based on conversation data according to example embodiments.

FIG. 11 is a diagram illustrating a computing system that may be used in any of the example embodiments described herein.

DETAILED DESCRIPTION

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a platform that generates diagrams of software architecture based on generative artificial intelligence. In some embodiments, a generative artificial intelligence (GenAI) model may be trained to understand software architecture based on a large corpus of architecture documents and architecture descriptions. Through the training process, the GenAI model may learn a correlation between text (e.g., words) and software architecture components. Furthermore, the GenAI model may also generate architecture diagrams.

According to various embodiments, the GenAI model may be a large language model (LLM), such as a multimodal large language model. As another example, the GenAI model may be a transformer neural network ("transformer") or the like. The GenAI model is capable of understanding connections between text and components (e.g., boxes, lines, arrows, software architecture, etc.) within software architecture drawings. For example, the GenAI model may include libraries and deep learning frameworks that enable the GenAI model to create realistic diagrams based on text inputs.

By creating software architecture diagrams from text, the GenAI model can relieve a user from having to generate such diagrams. Furthermore, the GenAI model described herein can learn software architecture and provide recommendations to the architects of the software system. The recommendations can include recommendations for filling in software components that are not included within the software architecture.

Furthermore, the GenAI model described herein can receive diagrams as input, such as partial diagrams/views of software architecture from a different respective domain and can generate a "complete" diagram of the software architecture of a plurality of different domains based on the partial diagrams. Here, the GenAI model may "fit" together the pieces of the software architecture and identify missing components that are needed to help the pieces of the software architecture co-exist.

Figure 1A:
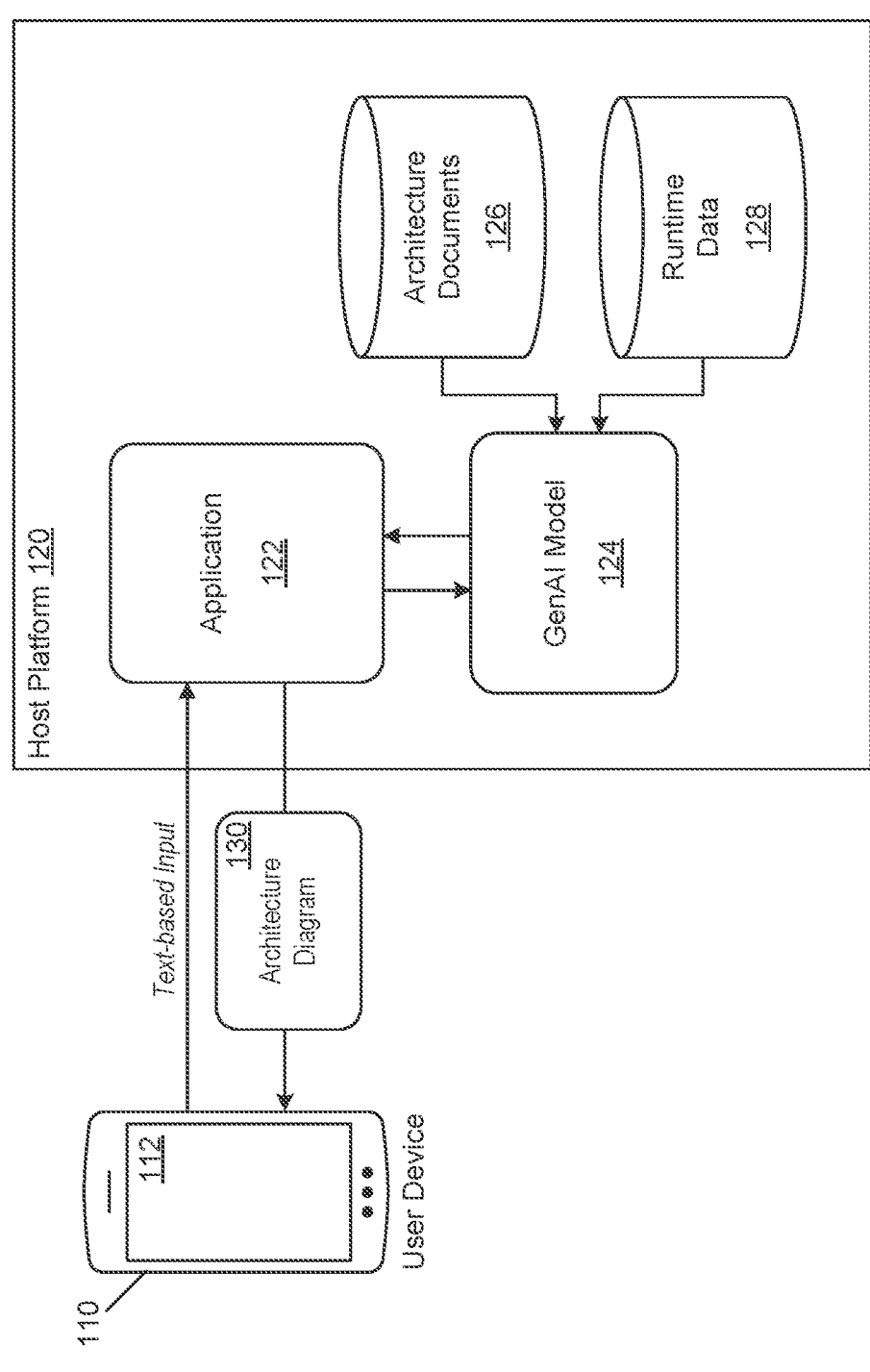
FIG. 1A is a diagram illustrating a generative artificial intelligence (GenAI) computing environment for generating architecture diagrams according to example embodiments.
Figure 1B:
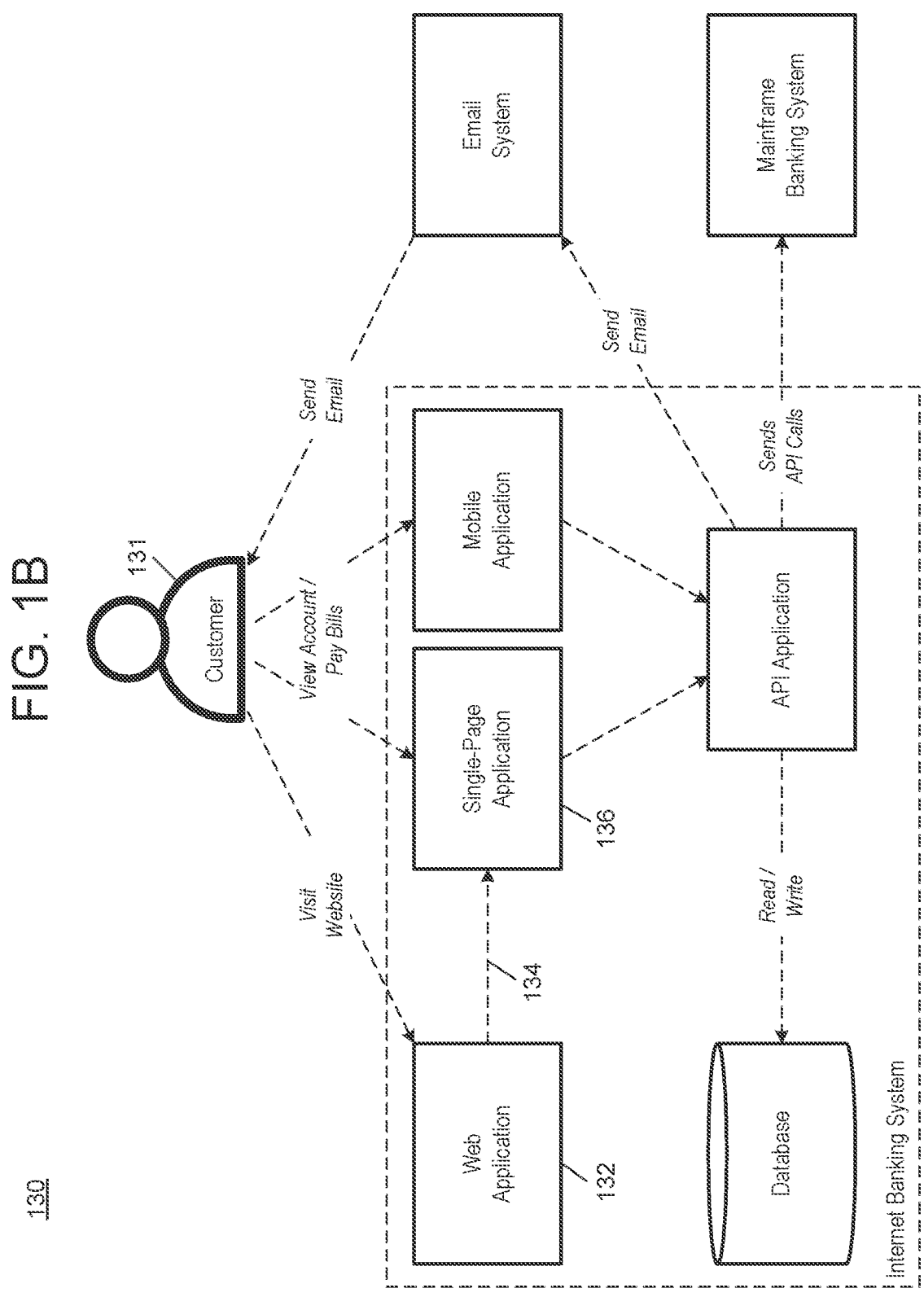
FIG. 1B is a diagram illustrating an example of a generative architecture diagram according to example embodiments.

FIG. 1A illustrates a GenAI computing environment for generating architecture diagrams according to example embodiments and FIG. 1B illustrates an example of a generative architecture diagram according to example embodiments. For example, FIG. 1A illustrates a process 100 of a host platform 120, such as a cloud platform, web server, etc., interacting with a user device 110, such as a mobile device, a computer, a laptop, or the like. As just one example, the host platform 120 may host a software application 122 that is accessed by the user device 110 over a computer network such as the Internet. As an example, the software application 122 may be a mobile application that includes a front-end that is installed on the user device 110 and a back-end that is installed on the host platform 120. As another example, the software application 122 may be a progressive web application (PWA) that is hosted by the host platform 120 and made accessible to the user device 110 via an address on the web.

In the example embodiments, the host platform 120 may include one or more generative artificial intelligence (GenAI) models, including GenAI model 124, which can prompt a user for information (e.g., images, text, etc.) and generate software architecture diagrams based on responses to the prompts. The host platform 120 may also include one or more additional models, including one or more machine learning models, one or more artificial intelligence (AI) models, one or more additional GenAI models, and the like. The models, including the GenAI model 124, may be held by the host platform 120 within a model repository (not shown).

In the example embodiments, the GenAI model 124 may be trained based on software architecture documents and descriptions that the GenAI model can use to learn connections between text and diagram pieces. For example, the software architecture documents may be stored within a data store 126 on the host platform. In addition, the GenAI model 124 may learn and may also receive as input runtime data of the software architecture from a second data store 128 of the host platform 120. Here, the runtime data may include runtime data/flow between the software components of the software architecture and may be used by the system to generate a "real-time" view of the software architecture.

As an example, the runtime data from the second data store 128 may include API calls, database queries, data transfers, method calls, and the like, which can be used by the GenAI model 124 to diagram the software architecture. In this example, the GenAI model 124 may identify the current components that are running within the software architecture based on the runtime data. This method is more accurate than a user "remembering" the content within the software architecture because it's based on actual data that is generated by the software systems in the software architecture. The GenAI model 124 can understand connections between entries in the runtime data/log data and diagram components.

The data store 126 and/or the second data store 128 may be accessed via one or more application programming interfaces (APIs). Although not shown, the host platform 120 may also access one or more external systems (e.g., databases, websites, etc.) over a computer network and collect/retrieve data from the one or more external systems, including user data.

In the example of FIG. 1A, a user has entered a text-based input into a user interface 112 on the user device 110, which is sent to the software application 122 on the host platform 120 over the network. The text may be entered in response to a prompt on the user interface 112 that is generated by the GenAI model 124. However, a prompt is not required. In other words, the user could directly query the software application 122 for information about the software architecture. The software application 122 inputs the text input into the GenAI model 124, which generates an architecture diagram 130 in response to the text input. In this example, the text input may include a description (text) of a software architecture system or component, and the GenAI model 124 may convert the text into a diagram that shows the corresponding software architecture in diagram format. The architecture diagram 130 may be submitted to the user device 110 and displayed on the user interface 112.

Referring now to FIG. 1B, the architecture diagram 130 output by the GenAI model 124 in FIG. 1A is shown in more detail. In this example, the architecture diagram includes boxes, directional lines, arrows, text, and the like, which can be used to identify the software architecture of a software system. In this example, a first software system is shown inside a box 132 within the architecture diagram, and an edge 134 between the box 132 and a box 136 corresponds to a second software system is also shown. In some embodiments, the edge 134 may include annotations that identify the interaction between the two components, such as the method, function, etc. Furthermore, a customer 131 is shown interacting with different components within the software architecture.

The GenAI model 124 is trained to generate diagrams of software architecture from text. For example, the model may be embedded with mappings between software architecture components and text descriptions. As an example, the GenAI model 124 may be a multi-modal large language model (LLM). In this example, a first modality of the GenAI model 124 may receive text, images, etc., and convert it into a diagram, such as a UML diagram, that includes both text and graphics (images) of the software architecture. The diagram can then be converted into an architecture diagram (e.g., as shown in FIG. 1B) based on a second modality.

Figure 2:
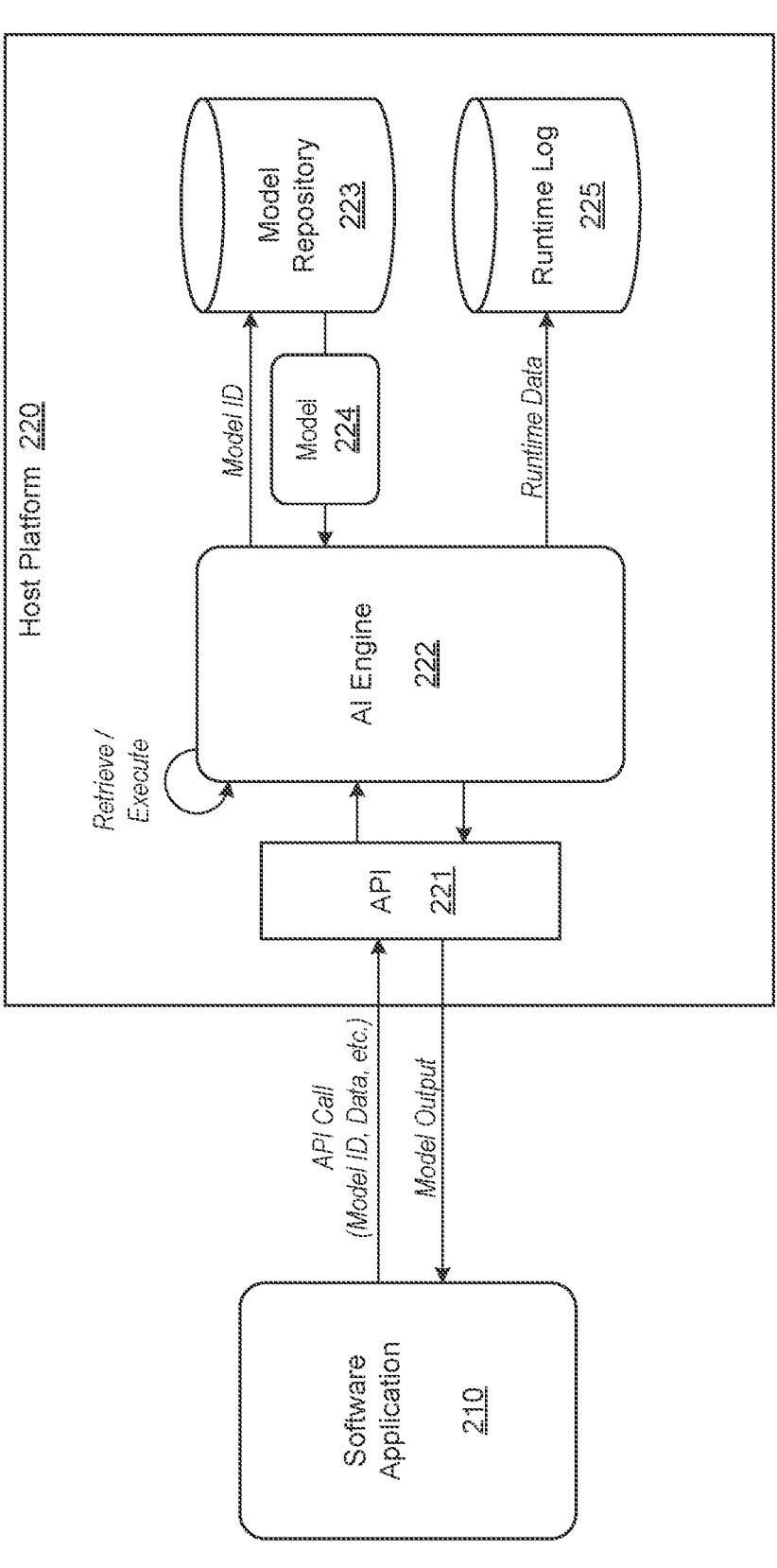
FIG. 2 is a diagram illustrating a process of executing a machine-learning model on input content according to example embodiments.

FIG. 2 illustrates a process 200 of executing a model 224 on input content according to example embodiments. As an example, the model 224 may be the GenAI model 124 described with respect to FIG. 1A, however, embodiments are not limited thereto. Referring to FIG. 2, a software application 210 may request execution of model 224 by submitting a request to the host platform 220. In response, an AI engine 222 may receive the request and trigger the model 224 to execute within a runtime environment of the host platform 220.

In FIG. 2, the AI engine 222 may control access to models that are stored within the model repository 223. For example, the models may include GenAI models, AI models, machine learning models, neural networks, and/or the like. The software application 210 may trigger execution of the model 224 from the model repository 223 via submission of a call to an API 221 (application programming interface) of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the payload of data may be a format that is not capable of being input to the model 224 nor read by a computer processor. For example, the payload of data may be in text format, image format, audio format, and the like. In response, the AI engine 222 may convert the payload of data into a format that is readable by the model 224, such as a vector or other encoding. The vector may then be input to the model 224.

In some embodiments, the software application 210 may display a user interface that enables a user thereof to provide feedback from the output provided by the model 224. For example, a user may input a confirmation that the predicted image of a goal generated by a GenAI model is correct or is liked. This information may be added to the results of execution and stored within a runtime log 225. The runtime log 225 may include an identifier of the input, an identifier of the output, an identifier of the model used, and feedback from the recipient. This information may be used to subsequently re-train the model.

Figure 3A:
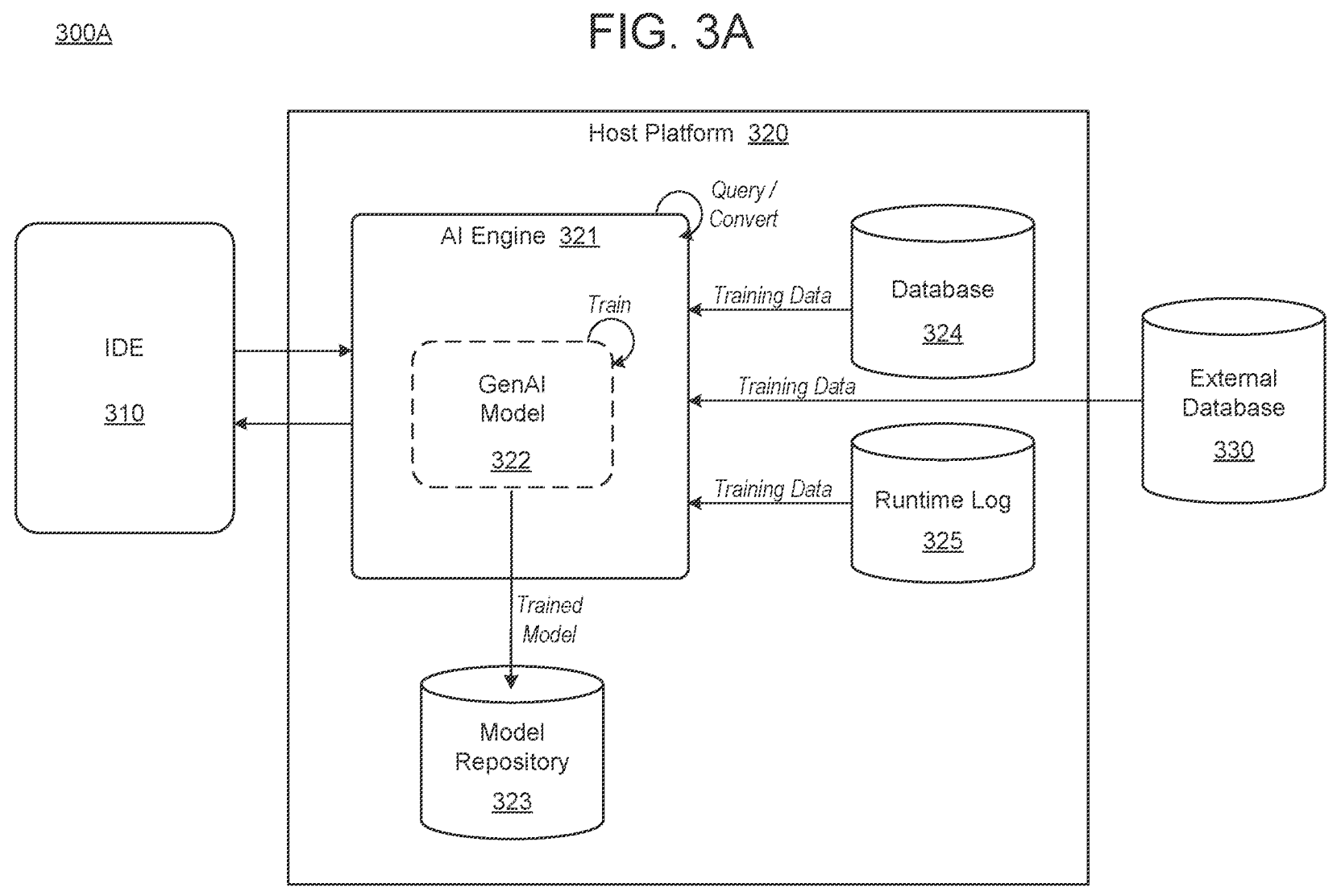

FIG. 3A illustrates a process 300A of training a GenAI model 322 according to example embodiments. However, it should be appreciated that the process 300A, shown in FIG. 3A is also applicable to other types of models such as machine learning models, AI models, and the like. Referring to FIG. 3A, a host platform 320, may host an IDE 310 (integrated development environment) where GenAI models, machine learning models, AI models, and the like may be developed, trained, retrained, and the like. In this example, the IDE 310 may include a software application with a user interface accessible by a user device over a network or through a local connection. For example, the IDE 310 may be embodied as a web application that can be accessed at a network address, URL, etc., by a device. As another example, the IDE 310 may be locally or remotely installed on a computing device used by a user.

The IDE 310 may be used to design a model (via a user interface of the IDE), such as a generative artificial intelligence model that can receive text as input and generate custom imagery, etc. The model can then be executed/trained based on the training data established via the user interface. For example, the user interface may be used to build a new model. The training data for training such a new model may be provided from a training data store such as a database 324, which includes training samples from the web, from customers, and the like. As another example, the training data may be pulled from one or more external data stores 330, such as publicly available sites, etc.

During training, the GenAI model 322 may be executed on training data via an AI engine 321 of the host platform 320. The training data may include a large corpus of generic images and text that is related to those images. In the example embodiments, the training data may include software architecture diagrams (images) paired with descriptions (text) of the software architecture diagrams. The GenAI model 322 may learn mappings/connections between text and imagery during the execution and can thus create diagrams of the software architecture from input text. When the model is fully trained, it may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/images that are custom generated by the GenAI model 322, and the user feedback of the images may be used to retrain the model to enhance further the images that are generated for all users. The responses may include indications of whether the generated software architecture diagram is correct and, if not, what aspects of the diagram are incorrect. This data may be captured and stored within a runtime log 325 or other data store within the live environment and can be subsequently used to retrain the GenAI model 322.

Figure 3B:
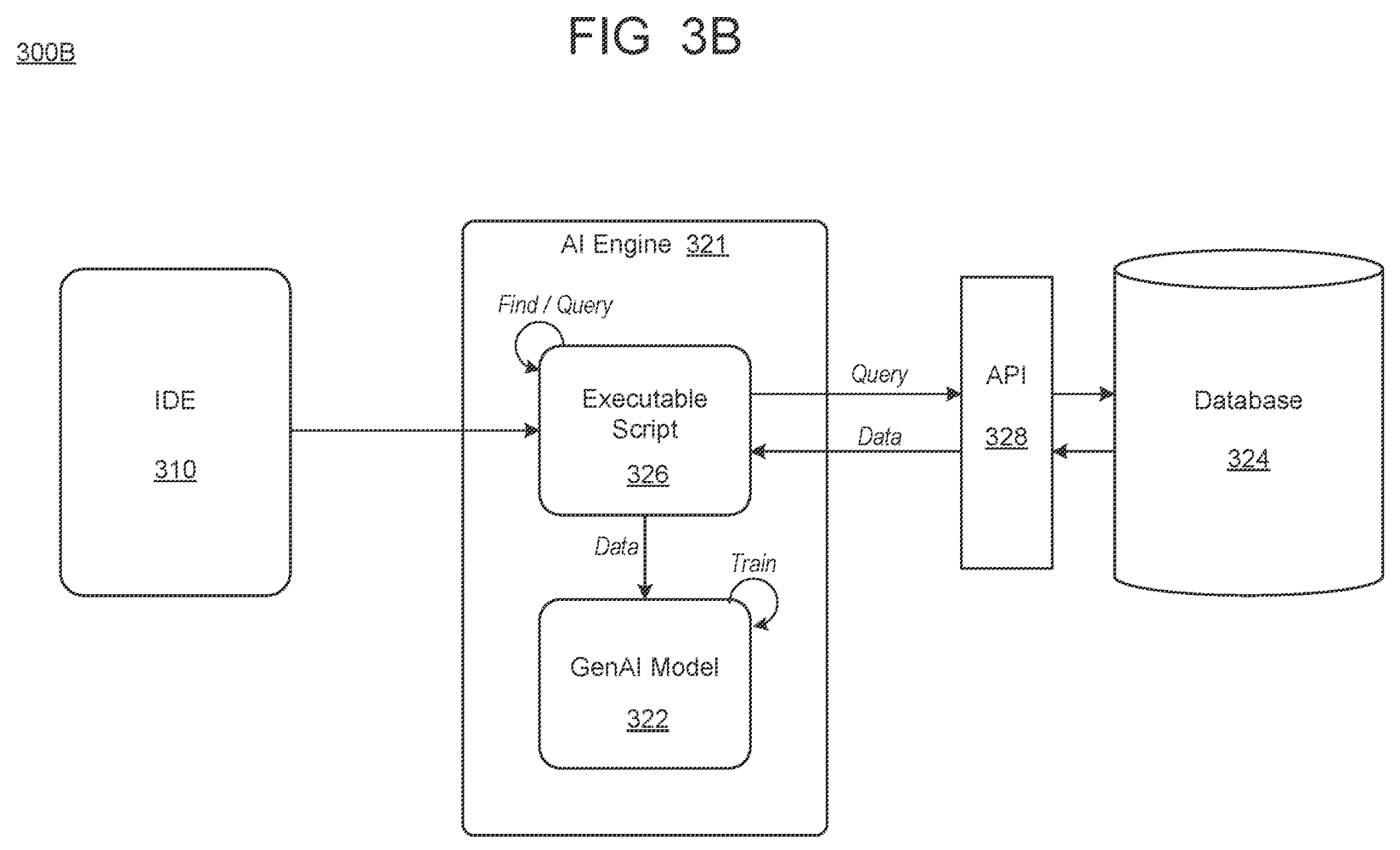

FIG. 3B illustrates a process 300B of executing a training process for training/retraining the GenAI model 322 via an AI engine 321. In this example, a script 326 (executable) is developed and configured to read data from a database 324 and input the data to the GenAI model 322 while the GenAI model is running/executing via the AI engine 321. For example, the script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321, where it is input to the GenAI model 322. The process may be managed via a user interface of the IDE 310, which enables a human-in-the-loop during the training process (supervised learning). However, it should also be appreciated that the system is capable of unsupervised learning as well.

The script 326 may iteratively retrieve additional training data sets from the database 324 and iteratively input the additional training data sets into the GenAI model 322 during the execution of the model to continue to train the model. The script may continue the process until instructions within the script tell the script to terminate, which may be based on a number of iterations (training loops), total time elapsed during the training process, etc.

Figure 3C:
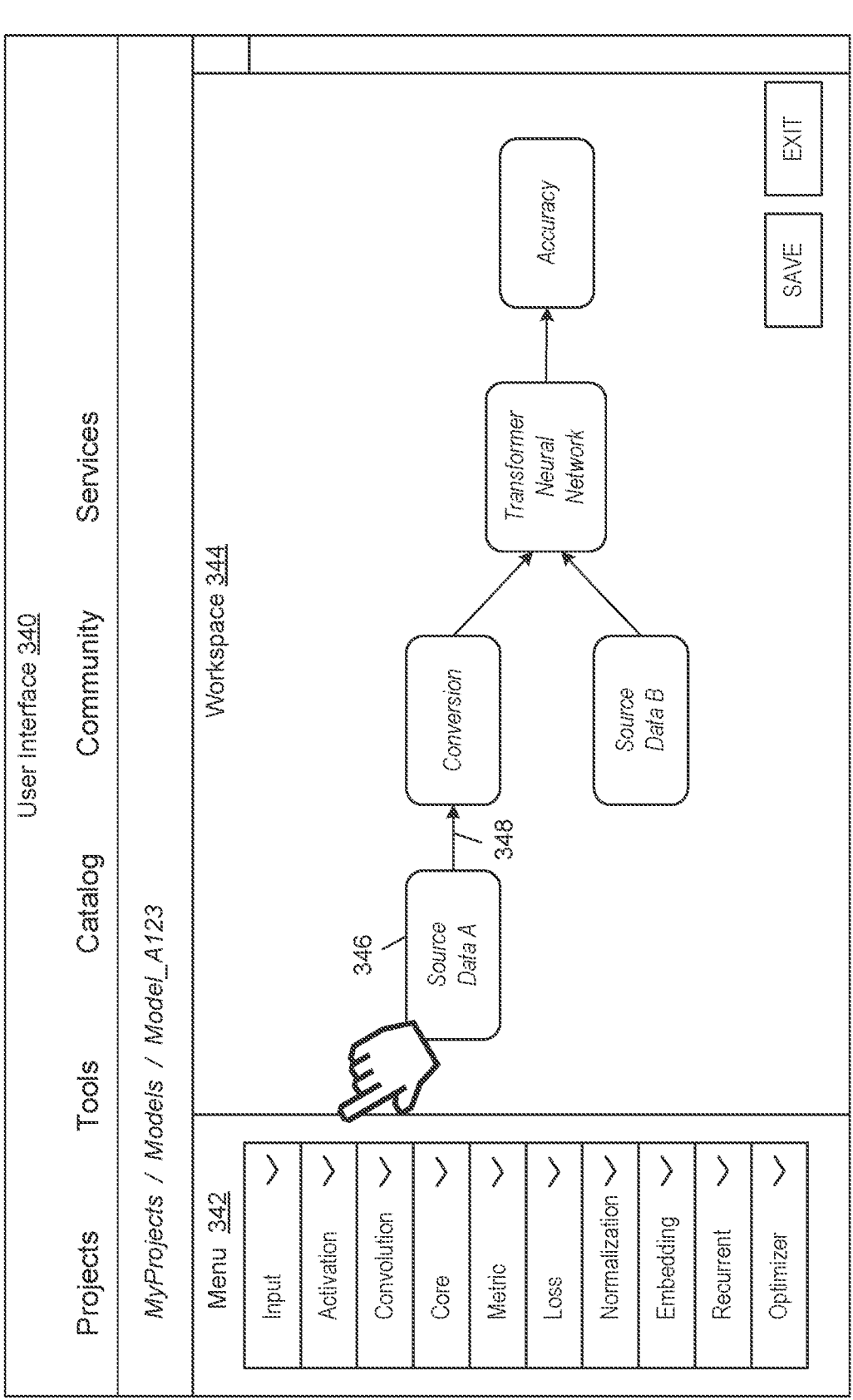

FIG. 3C illustrates a process 300C of designing a new AI model via a user interface 340 according to example embodiments. As an example, the user interface 340 may be output as part of the software application which interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model such as data components, model components, analysis components, etc., within a workspace 344 of the user interface 340.

In the example of FIG. 3C, the menu 342 includes a plurality of graphical user interface (GUI) menu options which can be selected to drill down into additional components that can be added to the model design shown in the workspace 344. Here, the GUI menu options include options for adding features such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a diagram of a new model within the workspace 344. For example, the user may connect the node 346 to another node in the diagram via an edge 348, creating a dependency within the diagram. When the user is done, the user can save the model for subsequent training/testing.

According to various embodiments, the GenAI model described herein may be trained based on custom-defined prompts that are designed to draw out specific attributes associated with a goal of a user. These same prompts may be output during the live execution of the GenAI model. For example, a user may input a description of a goal and possibly other attributes. The description/attributes can then be used by the GenAI model to generate a custom image that enables the user to visualize the goal. The prompts may be generated via prompt engineering that can be performed through the model training process, such as the model training process described above in the examples of FIGS. 3A-3C.

Prompt engineering is the process of structuring sentences (prompts) so that the GenAI model understands them. A prompt may include a description of a goal, such as a goal of purchasing a particular type of car. The prompt may also provide a color, year, make, and model of the car. All of this information may be input into the GenAI model and used to create a custom image of the goal to enable the user to visualize the goal. Part of the prompting process may include delays/waiting times that are intentionally included within the script such that the model has time to think/understand the input data.

Figure 4:
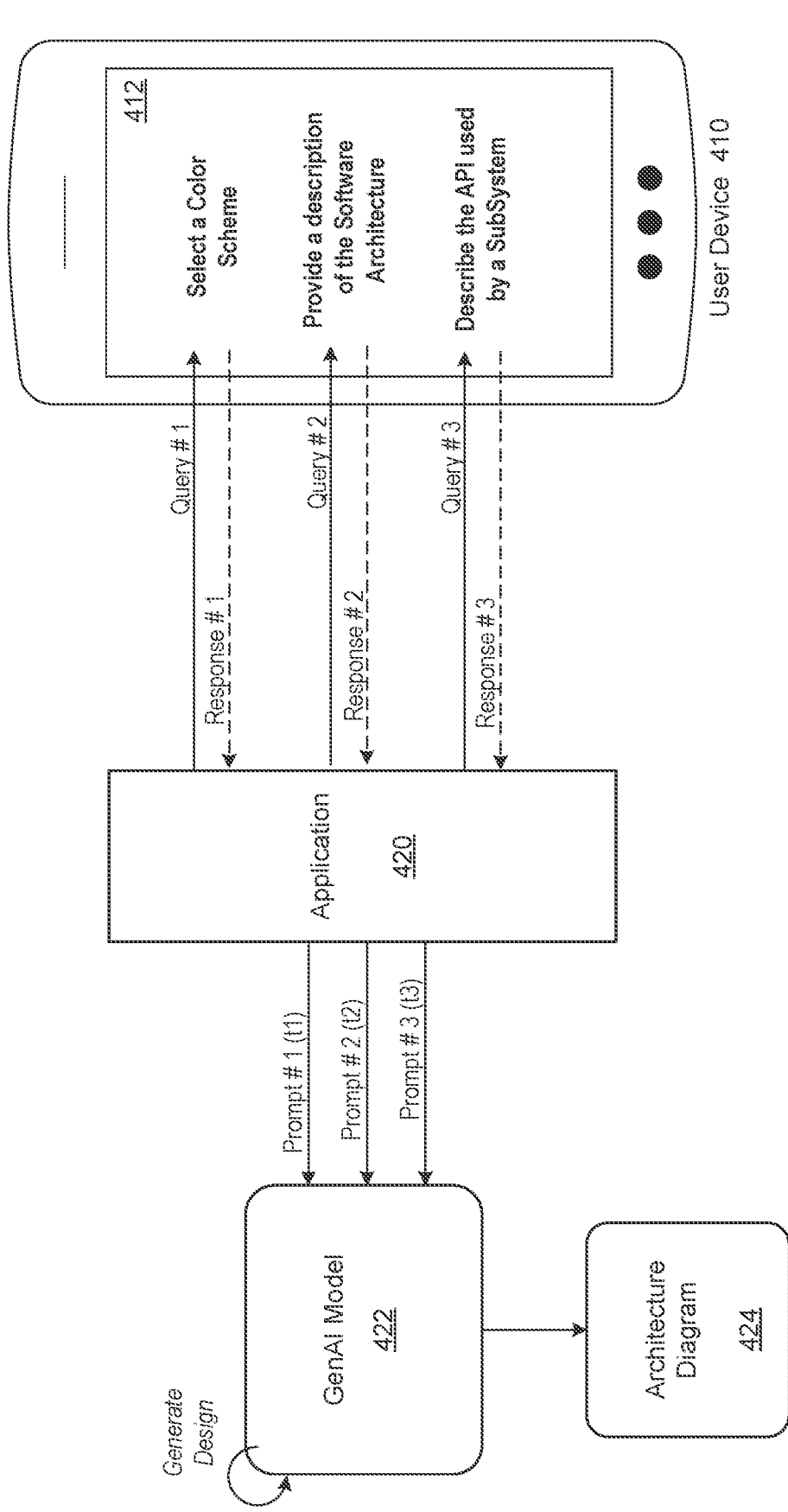
FIG. 4 is a diagram illustrating a process of prompting a GenAI model to generate an architecture diagram according to example embodiments.

FIG. 4 illustrates a process 400 of a GenAI model 422 generating an architecture diagram 424 of a software architecture based on prompts and responses to the prompts according to example embodiments. Referring to FIG. 4, the GenAI model 422 may be hosted by a host platform and may be part of a software application 420 that is also hosted on the host platform. Here, the software application 420 may establish a connection with a user device 410, such as a secure network connection. The secure connection may include a PIN, biometric scan, password, username, TTL handshake, etc.

In the example of FIG. 4, the software application 420 may control the interaction of the GenAI model 422 on the host platform and the user device 410. In this example, the software application 420 may output queries on a user interface 412 of the user device 410 with requests for information from the user. The user may enter values into the fields on the user interface corresponding to the queries, and submit/transfer the data to the software application 420, for example, by pressing a submit button, etc. In this example, the application may combine the query with the response from the user interface and generate a prompt that is submitted to the GenAI model 422. For example, each prompt may include a combination of a query on the UI plus the response from the user. For example, if the query is "Please describe the purpose of the software system" and the response is "The software system is an API that manages access to a cloud database," then the text from both the prompt and the response to the prompt may be submitted to the GenAI model 422.

In some embodiments, the software application 420 may deliberately add waiting times between submitting prompts to the GenAI model 422 to ensure that the model has enough time to "think" about the answer. The waiting times may be integrated into the code of the software application 420, or they may be modified/configured via a user interface. Furthermore, the ordering of the prompts and the follow-up questions that are asked may be different depending on the answers given during the previous prompt or prompts. The content within the prompts and the ordering of the prompts can cause the GenAI model 422 can architecture diagrams, descriptions of architecture diagrams, combinations of architecture diagrams, new architecture diagrams, and the like. Each prompt may include multiple components, including one or more of context, an instruction, input data, and an expected response/output.

Software architecture diagrams provide a visual representation of the structure, relationships, and interactions within a software system. However, diagrams can be interpreted differently by different individuals and often lack details. Furthermore, it can be challenging to ensure that a codebase reflects the designed architecture. Also, most diagrams represent a static system view that may not capture runtime interactions adequately. Additionally, diagrams need to be updated regularly to reflect changes in the architecture, and keeping diagrams synchronized with the actual system can become a challenge.

To mitigate these shortcomings, a generative artificial intelligence (AI) model can be trained on a repository of software architecture descriptions, including both graphics and text. This enables the model to learn a correlation between text and diagram components. The trained model can be used to generate a diagram of a software architecture from varying types of input and varying types of training.

Figure 5A:
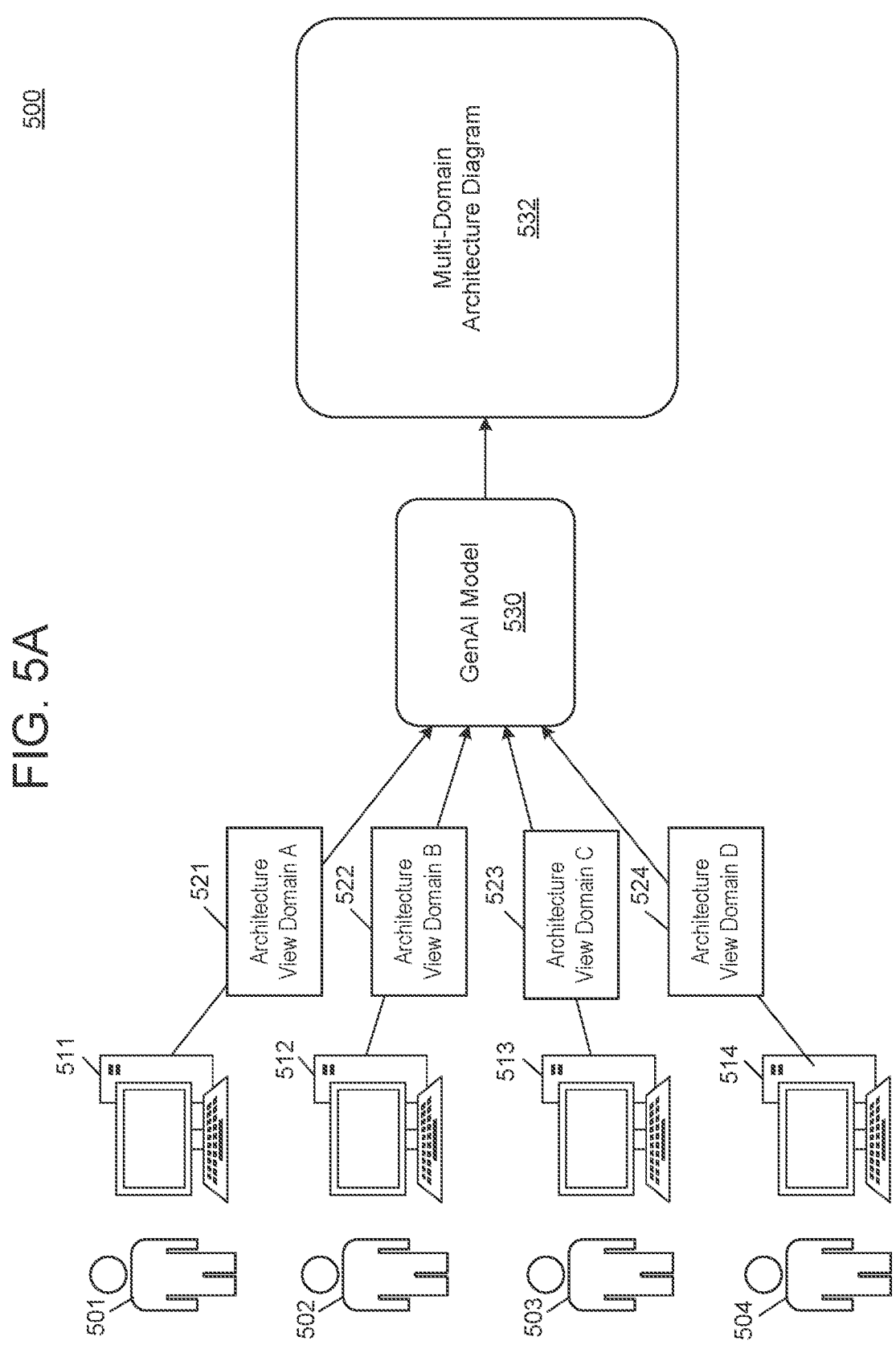

FIGS. 5A-5D illustrate a process of generating a complex architecture diagram from a plurality of architectural views according to example embodiments. For example, FIG. 5A illustrates a process 500 of generating a multi-domain architecture diagram 532 from multiple architecture "views" from different domains within an organization. In this example, a GenAI model 530 may receive architecture "views" from multiple different domains of the software architecture and generate a diagram (i.e., a complete view) of the multiple domains combined together. As such, the system can create a complete architecture of an organization, including multiple different domains and architects using GenAI.

In this example, there are four different software architects, including architect 501, architect 502, architect 503, an architect 504. The architects may use computing devices 511, 512, 513, and 514, respectively, to submit an architecture view 521, an architecture view 522, an architecture view 523, and an architecture view 524 of different domains of the software architecture. A domain may refer to a software system, such as an email system that uses a shared database, an API, etc. An architect may be tasked with managing this system, while another architect is tasked with managing a separate software system such as a mobile application. Here, the GenAI model may receive the architecture views 521, 522, 523, and 524 and generate the multi-domain architecture diagram 532. Here, the multi-domain architecture diagram 532 may be in a JavaScript Object Notation (JSON) format, an eXtensible Markup Language (XML) format, a VISIO® format, and the like.

In these examples, an architecture "view" may refer to a diagram of an architecture of a particular software application, a diagram from the perspective of a particular architect, from a particular domain, etc. Meanwhile, an architecture "diagram" may include a visualization of multiple architecture views, including intermediate software systems that are needed to glue the different domains together within the architecture diagram. Some examples of the architecture components that may be included within an architecture diagram include an executive summary, high-level requirements, architecture and design assumptions, application architecture, sequence diagrams, infrastructure architecture, security architecture, data architecture, legal and regulatory policy data and considerations, and the like.

FIG. 5B illustrates further details of the architecture views 521, 522, 523, and 524. In this example, each of the architectural views includes one or more architectural components. For example, the architecture view 521, an internet banking software system that includes a web application, a single page application (e.g., a web application that interacts with a user and dynamically rewrites the current web page with new data, etc.), and a mobile application. Meanwhile, the architecture view 522 includes a diagram of a database component and an API that is used to access the database. The architecture view 523 includes an email system, and the architecture view 524 includes a mainframe banking system. These systems are just examples of the types of elements that may be present within a software architecture diagram and are not meant to be limiting the scope of the present application.

Figure 5C:
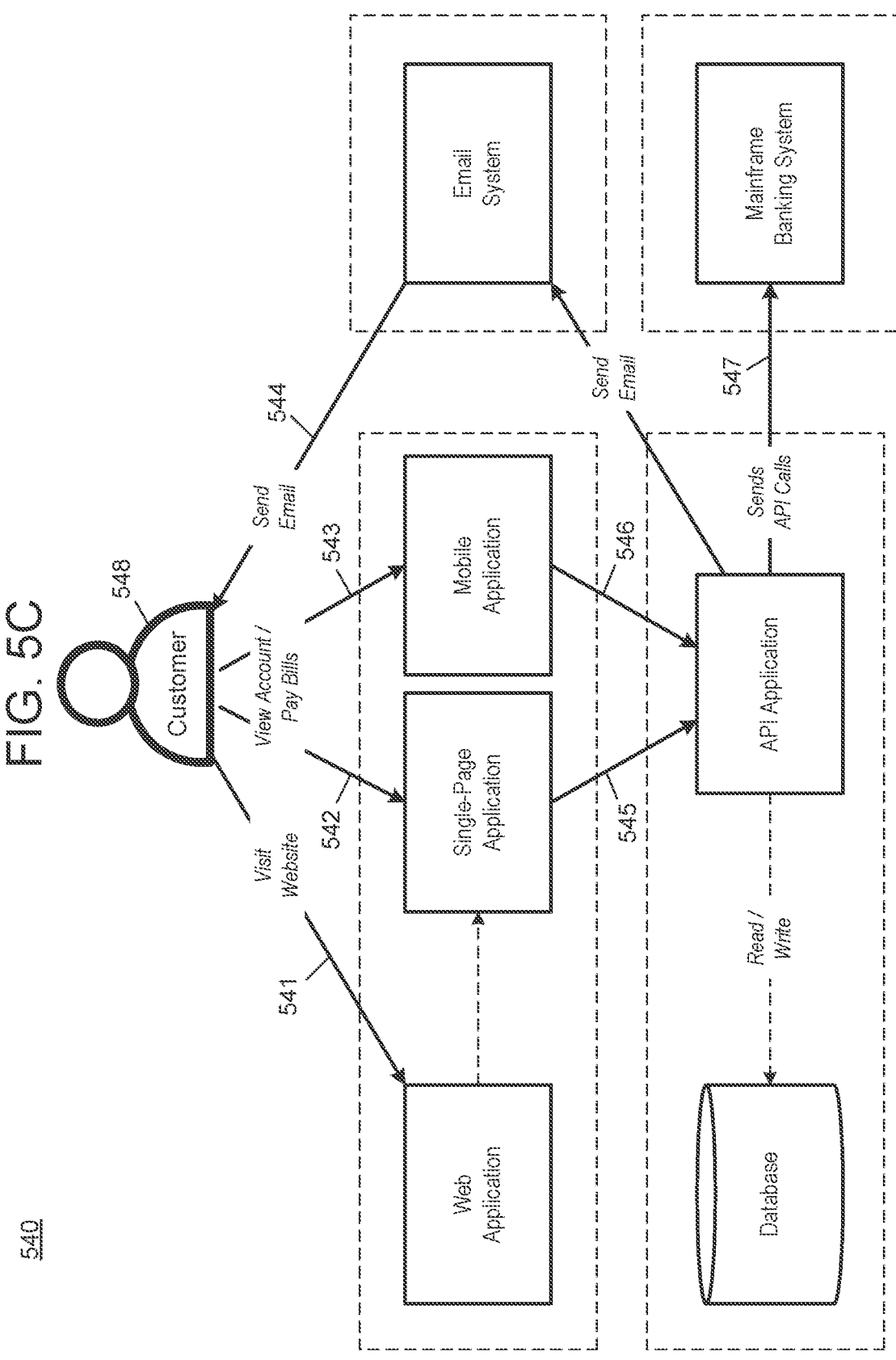

FIG. 5C illustrates a process 540 of generating the architecture diagram 532 from the architecture views 521, 522, 523, and 524. In this example, the GenAI model 530 may create edges 541, 542, 543, 544, 545, 546, and 547 between different domains/views of the software architecture and add a customer 548 to the diagram. Furthermore, annotations can be added to the edges to provide additional details, including actions, events, data transfers, etc., between two of the components within the diagram. The GenAI model 530 may "fit" together the different views of the architecture using generative artificial intelligence. The knowledge may be learned by training the GenAI model on a large corpus of software architecture documents that include both text and images or graphics related to the text.

Figure 5D:
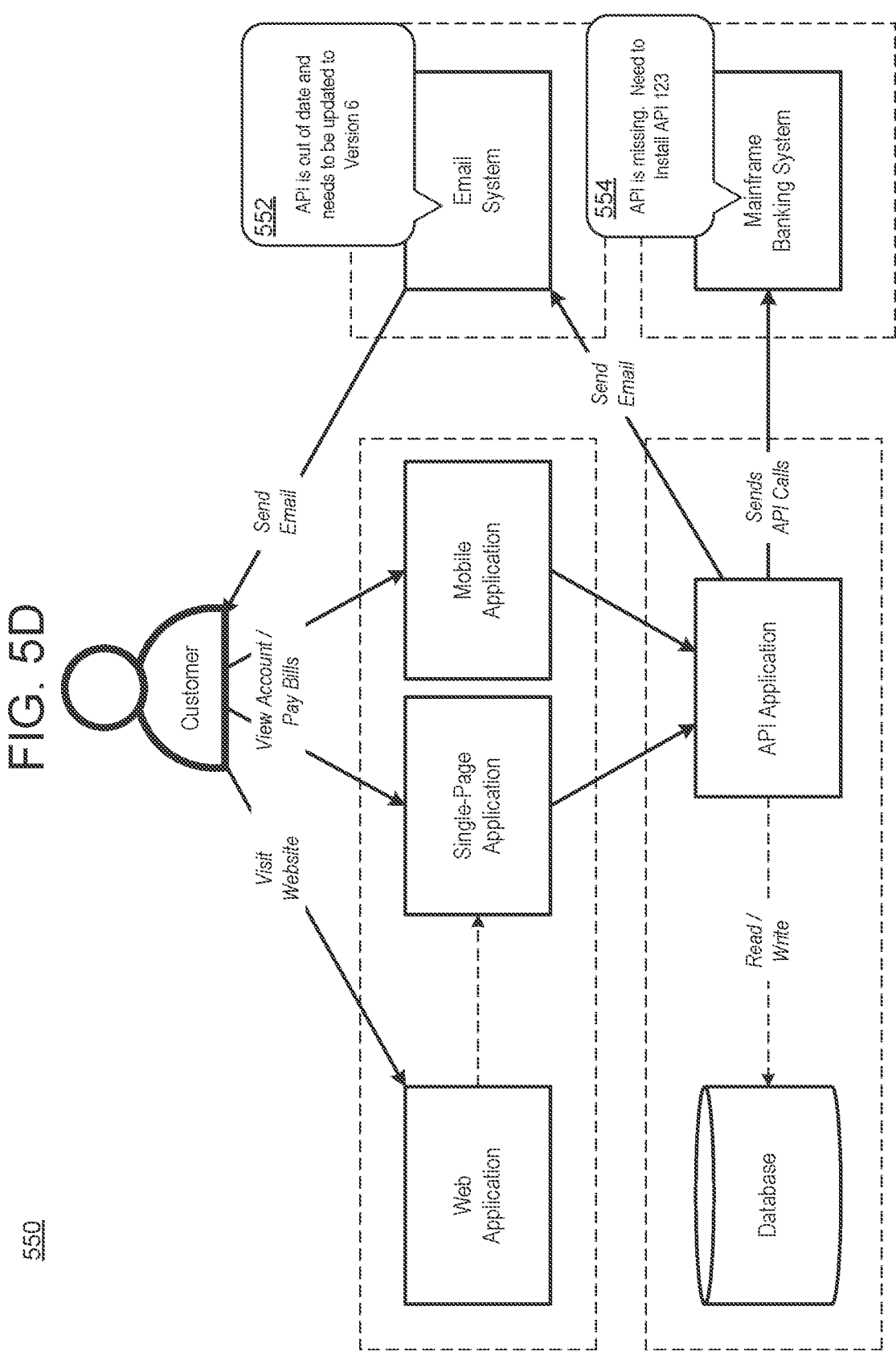

FIG. 5D illustrates a process 550 of detecting a gap that exists within the multi-domain architecture diagram 532. In this example, the user is viewing the multi-domain architecture diagram 532 on a user interface, such as a viewer of a software application or the like. Referring to FIG. 5D, the GenAI model 530 may identify that the email system in a first domain is not in alignment with a web application in a second domain based on an out-of-date API. In response, the GenAI model 530 may generate and display a notification 552 with a description of the component that needs to be added to the system to make it in alignment.

As another example, the GenAI model 530 may identify that a mainframe banking system in a third domain is missing an API for a database in a fourth domain of the software architecture. Here, the GenAI model 530 may output another notification 554 on the user interface, which identifies the missing API. In addition to outputting the notifications 552 and 554, the GenAI model may identify the API and even display the name of the API as well as a link to a download location, etc.

One example of how gaps may be identified is by looking at high-level requirements within a software architecture component and assessing whether additional information in the document is consistent. For example, the model may check to ensure that high-level requirements are shared (i.e., SSO must leverage the same SSO platform). Another example may be to identify misalignment to an organization's architecture principles (e.g., if most blueprints use a particular cloud service offering, but your new solution proposes using a different provider, the tool may recommend changing to the standard as identified by the majority of the documents, etc.) Furthermore, the model may also be trained on recommended patterns from external sources to allow for best practice recommendations as well as approved pattern repositories.

FIG. 6 illustrates an example of a multimodal GenAI model 630 according to example embodiments. Referring to FIG. 6, the multimodal GenAI model 630 may include multiple modes (or modalities) in which different processes are executed on different data in combination. For example, in FIG. 6, a first modality 632 of the multimodal GenAI model 630 receives architecture views 610 and 620 and converts them into descriptive text and graphics (images) that correspond to the different architectural views. In some embodiments, the descriptive text may be a unified markup language (UML) diagram with both text and graphics or the like. Here, a second modality 634 of the multimodal GenAI model 630 receives the text and graphics 638 and generates an architecture diagram and stores it within a file such as an XML file, a JSON file, a VISIO® file, or the like.

In the example of FIG. 6, the first modality 632 processes images and generates text and graphics, which are fed into the second modality 634. Here the second modality 634 generates the architecture diagram 640, which includes both domains from the architecture views 610 and 620 within a single diagram. In some embodiments, the second modality 634 may receive input from a data store 636, with architecture documentation and descriptions. The multimodal GenAI model 630 may learn from the text that is ingested for context, i.e., bigger picture value of architectural components and what capabilities they provide and learn from image data that is ingested for diagram representation. Potential to also leverage API marketplace to obtain API specifications and descriptions.

Here, the architecture views may be converted into a text format which the model can more easily learn from. Furthermore, the GenAI model may prompt a user for additional information via a user interface (not shown), such as descriptions of architecture components, descriptions of service providers, etc., and use the responses along with the prompts to learn more information about the architecture further. Then, the model may generate the architecture diagram.

Figure 7A:
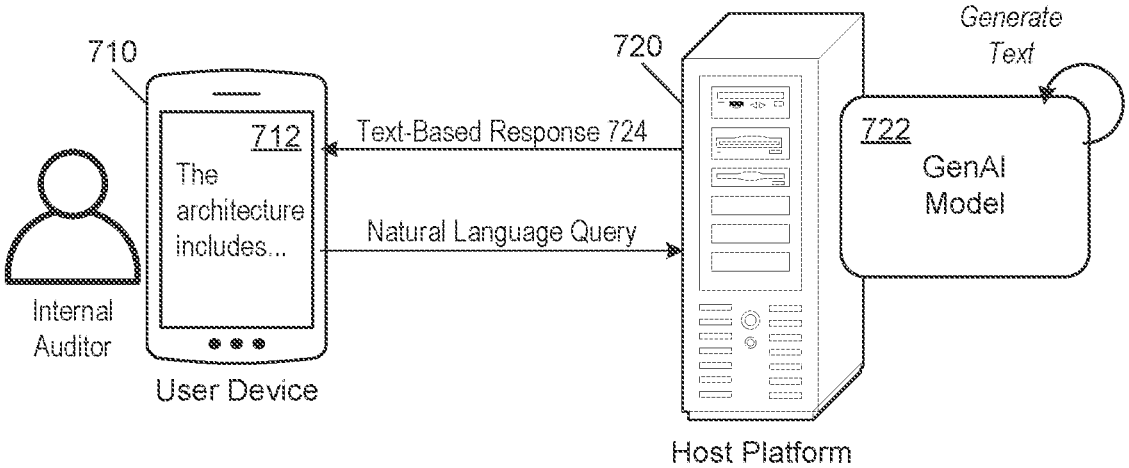
FIGS. 7A-7B are diagrams illustrating a process of auditing a software architecture via a GenAI model according to example embodiments.
Figure 7B:
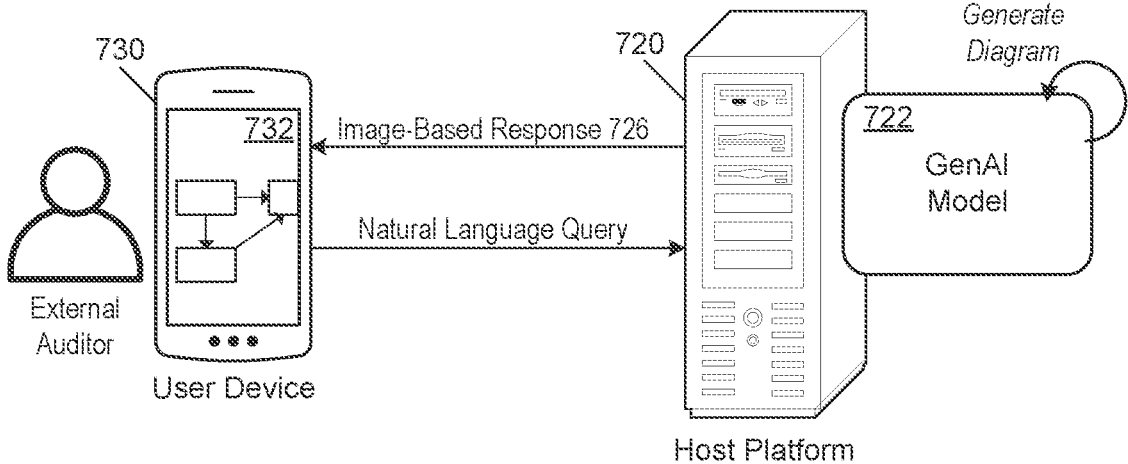

FIGS. 7A-7B illustrates processes for auditing a software architecture via a GenAI model according to example embodiments. Audits may commonly be performed on a software system to understand whether it satisfies corporate compliance policies and other best practices in the industry. The audits may be performed by internal auditors (who are part of the organization) and external auditors (who may require documentation of some kind).

FIG. 7A illustrates a process 700 in which a user may input a natural language query (e.g., such as a question about a software architecture of an organization, etc.) to a user interface 712 on a user device 710 and sends the query to a host platform 720 over a network. Here, the host platform 720 may host an application that includes the user interface 712. In response, the host platform 720 may execute a GenAI model 722 on the query to generate a text-based response 724. The text-based response 724 may include a descriptive answer to the user's query. For example, the query may include, please tell me the location of an API. In response, the GenAI model may identify the API within the architecture and generate a description of the functionality and the purpose of the API. The response may be displayed on the user interface 712 or output via an audio means or the like.

FIG. 7B illustrates a process 740, which is like the process 700 that is performed in FIG. 7A. However, in this example, the GenAI model 722 receives a text-based input from a user interface 732 of a user device 730 and generates an image-based response 726 (e.g., an answer, etc.). The image-based response 726 may include a diagram of the architecture component that the user is asking about or a diagram of another architecture component, etc. Here, the GenAI model is trained to identify correlations between text and architecture diagrams and can convert the text into an image.

Figure 8:
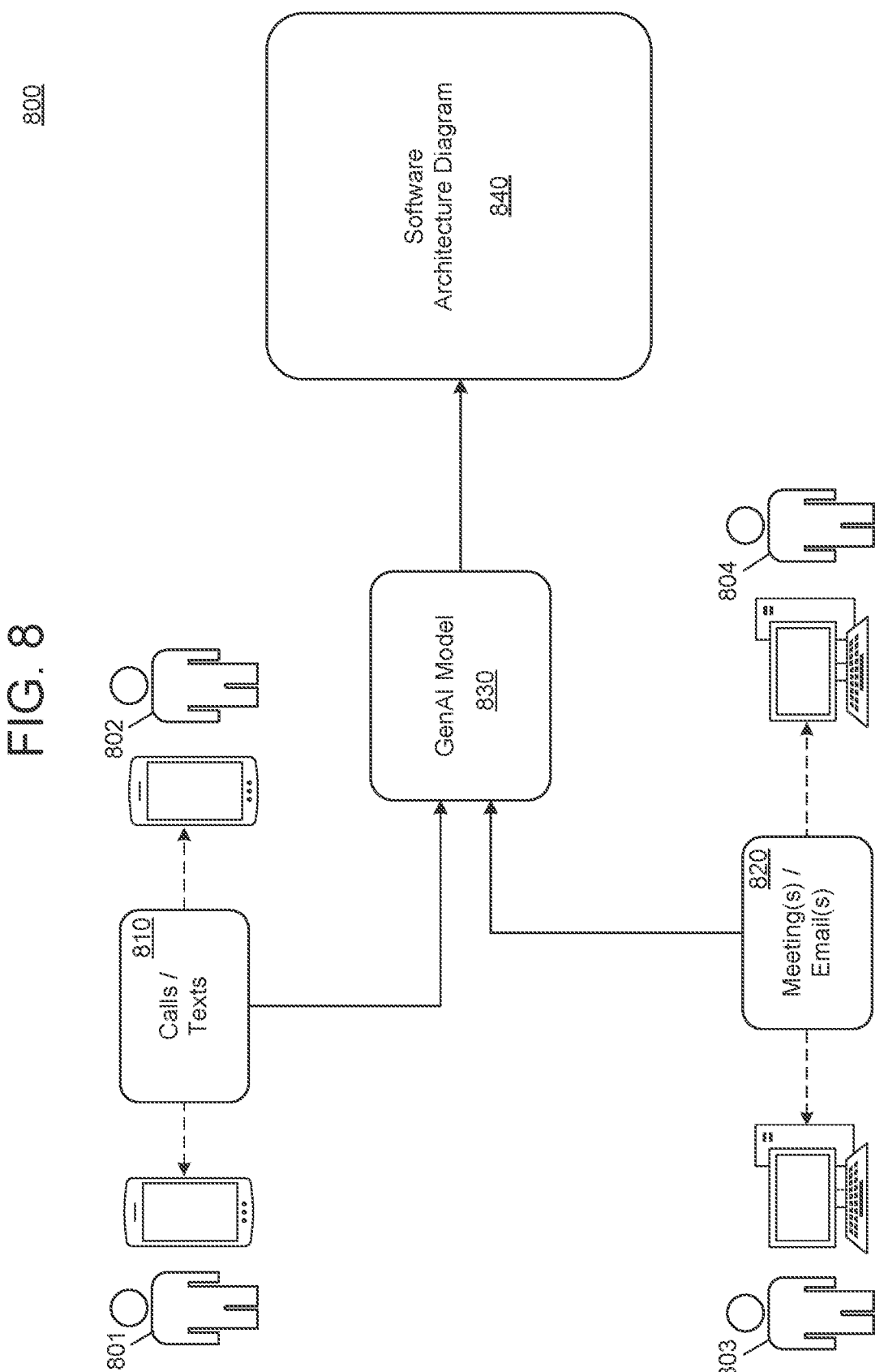
FIG. 8 is a diagram illustrating a process of building a software architecture diagram based on conversation data according to example embodiments.

FIG. 8 illustrates a process 800 of building a software architecture diagram 840 based on conversation data according to example embodiments. In this example, the system may include a recorder that is in a central environment and that is able to record or at least transcribe and store conversations between users, such as calls, meetings, emails, texts, and the like. The recorder may be a software program that creates a log of the communications sent from the device (e.g., email, phone call, text message, etc.) and the content within the communications. As an example, the recorder may capture calls and/or texts 810 exchanged between a user 801 and a user 802 via their respective mobile devices. As another example, the recorder may capture emails and meetings 820 that are sent/conducted between a user 803 and a user 804 on their respective computing devices. The log may be input to a GenAI model 830.

In this example, the GenAI model 830 may collate relevant emails, calls, team messages, and meeting recordings to learn architectural components and what capabilities they provide and ingest images for diagram representation.

Furthermore, the system may obtain documents created, written and verbal context attained through the respective mediums. The model may be multi-modal in order to process both images and text.

Figure 9:
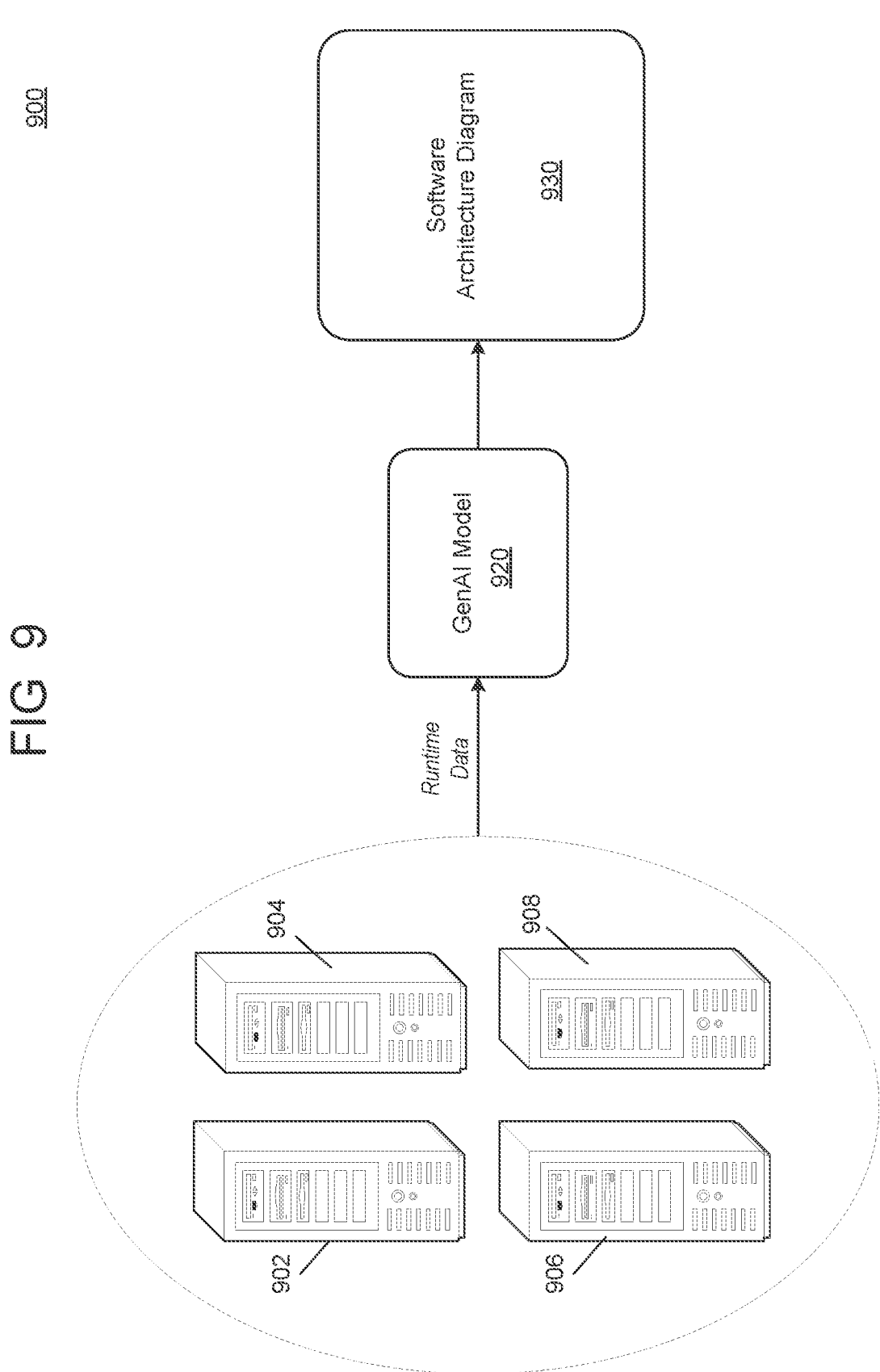
FIG. 9 is a diagram illustrating a process of generating a software architecture diagram using runtime data from systems of the software architecture according to example embodiments.

FIG. 9 illustrates a process 900 of generating a "real-time" software architecture diagram using runtime data from systems of the software architecture according to example embodiments. As previously noted, software architecture documents are often "out of date" and refer to older versions or different versions of a software architecture. There are multiple reasons for this, including that generating diagrams can be challenging, and it can also be very time-consuming. In the example of FIG. 9, runtime data from a plurality of systems 902, 904, 906, and 908 is logged based on execution of the plurality of systems 902, 904, 906, and 908 and the software that they host.

GenAI model 920 generates an architecture diagram 930 of a software architecture based on runtime data (e.g., log data, etc.) from the plurality of systems 902, 904, 906, and 908. Here, the plurality of systems 902, 904, 906, and 908 include one or more web servers, cloud platforms, on-premises servers, databases, software applications, APIs, etc. when executing during live operation.

In response to receiving the runtime data, the GenAI model 920 can generate a diagram of the architecture based on the words included in the runtime data because the GenAI model 920 learns a correlation between text and images of architecture documents. To do this, the GenAI model 920 is trained on a large corpus of architectural documents and images. Here, the log data includes text data that can be interpreted by the GenAI model 920 to generate a corresponding architecture diagram that is based on the current runtime data of the system and is therefore considered "real-time."

FIG. 10A illustrates a method 1000 of generating a real-time diagram of a software architecture according to example embodiments. As an example, the method 1000 may be performed by a computing system, a software application, a server, a cloud platform, a combination of systems, and the like. Referring to FIG. 10A, in 1001, the method may include storing software architecture diagrams in a data store. In 1002, the method may include receiving runtime data from a plurality of different software systems within a software architecture; the runtime data may include descriptions of events that occur during runtime between the different software systems of the software architecture. In 1003, the method may include generating a diagram of the software architecture based on the execution of a multi-modal generative artificial intelligence (GenAI) model on the runtime data and the software architecture diagrams stored in the data store. In 1004, the method may include displaying the diagram of the software architecture via a user interface.

In some embodiments, the generating may include generating a unified markup language (UML) diagram via the GenAI model, wherein the UML diagram may include both text and graphics that describe the plurality of different architecture diagrams of the software architecture. In some embodiments, the generating the description may include generating the diagram of the software architecture based on the UML diagram and based on the stored software architecture documents in the data store via the second process of the GenAI model.

In some embodiments, the runtime data may include one or more of calls, data flows, and communications between a plurality of different components of the software architecture, and the generating may include fitting the plurality of different components together to generate a complete diagram of the plurality of different pieces of the software architecture based on the execution of the GenAI model. In some embodiments, the method may further include receiving feedback about the generated diagram of the software architecture via the user interface and retraining the GenAI model based on the generated diagram and the received feedback.

In some embodiments, the generating the diagram of the software architecture may include generating the diagram of the software architecture via a software application and rendering the diagram of the software architecture via a viewer of the software application, which is displayed on the user interface. In some embodiments, the receiving may further include receiving descriptions of a plurality of application programming interfaces (APIs) of the software architecture, and the generating may further include generating the diagram of the software architecture based on the execution of the GenAI on the descriptions of the plurality of APIs. In some embodiments, the generating may further include displaying a prompt on the user interface, receiving a response to the prompt via the user interface, and generating the diagram of the software architecture based on the prompt and the response to the prompt.

Figure 10B:
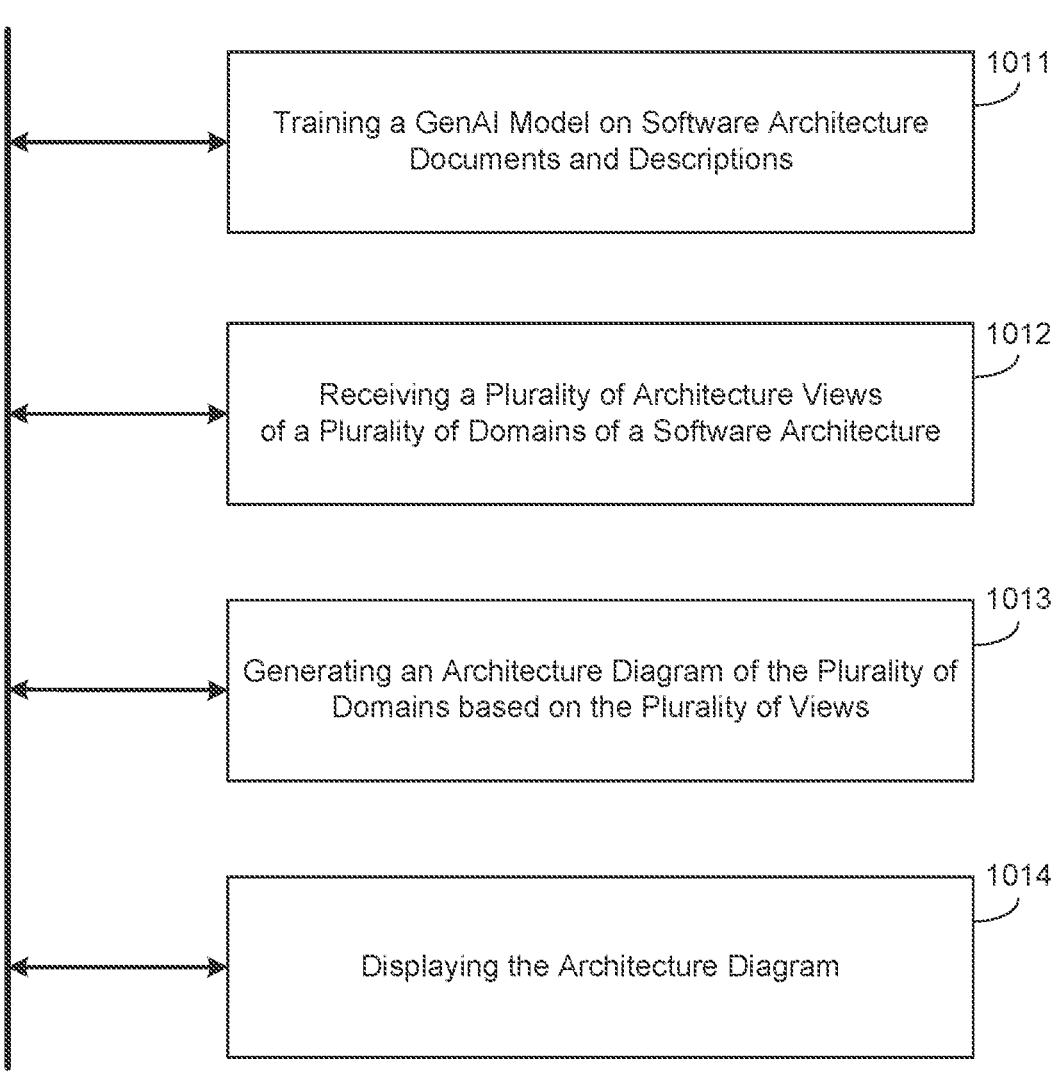
FIG. 10B is a diagram illustrating a method of generating a multi-domain architecture diagram from multiple domain views according to example embodiments.

FIG. 10B illustrates a method 1010 of generating a multi-domain architecture diagram from multiple domain views according to example embodiments. As an example, the method 1010 may be performed by a computing system, a software application, a server, a cloud platform, a combination of systems, and the like. Referring to FIG. 10B, in 1011, the method may include training a generative artificial intelligence (GenAI) model via execution of the GenAI model on descriptions and diagrams of a software architecture. In 1012, the method may include receiving a plurality of different architectural views from a plurality of different domains of the software architecture. In 1013, the method may include generating an architecture diagram of the plurality of domains of the software architecture in combination based on the execution of the GenAI model on the plurality of different architecture views from the plurality of different domains. In 1014, the method may include displaying the architecture diagram of the plurality of domains of the software architecture via a user interface.

In some embodiments, the receiving may include receiving a plurality of different blueprints of the plurality of different domains of the software architecture, and the generating may include generating the architecture diagram based on the execution of the GenAI model on the plurality of different blueprints. In some embodiments, the receiving may include receiving the plurality of different architecture views from a plurality of different software architects, and the generating may include generating the architecture diagram based on the execution of the GenAI model on the plurality of different architecture views from a plurality of different software architects. In some embodiments, the method may further include receiving feedback about the architecture diagram via the user interface and retraining the GenAI model based on the architecture diagram and the received feedback on the architecture diagram.

In some embodiments, the method may further include generating suggested changes to the software architecture via the execution of a machine learning model on the architecture diagram of the software architecture. In some embodiments, the method may further include receiving a feature set that may include a description of features for a new software architecture and generating an architecture diagram of the new software architecture via execution of the GenAI model on the feature set. In some embodiments, the generating may further include displaying a prompt on the user interface, receiving a response to the prompt via the user interface, and generating the architecture diagram of the plurality of domains based on the prompt and the response to the prompt.

In some embodiments, the GenAI model may include a multi-modal GenAI model, and the generating may include generating a description of the software architecture based on the plurality of different architecture diagrams via a first modality of the multi-modal GenAI model and generating the architecture diagram of the plurality of domains of the software architecture based on the description via a second modality of the multi-modal GenAI model.

FIG. 10C illustrates a method 1020 of identifying gaps in a software architecture according to example embodiments. As an example, the method 1020 may be performed by a computing system, a software application, a server, a cloud platform, a combination of systems, and the like. Referring to FIG. 10C, in 1021, the method may include receiving a plurality of architecture documents of a plurality of different domains of a software architecture. In 1022, the method may include identifying a missing component that is missing from within the software architecture between a first domain and a second domain among the plurality of domains based on the execution of a generative artificial intelligence (GenAI) model based on the plurality of architecture documents of the software architecture. In 1023, the method may include generating a recommended modification to the software architecture based on the identified missing component. In 1024, the method may include displaying the recommended modification via a user interface.

In some embodiments, the identifying may include identifying the missing component based on a misalignment between service providers of the first and second domains detected by the GenAI model from the plurality of architecture documents. In some embodiments, the identifying may include identifying the missing component based on a difference in requirements between the first and second domains detected by the GenAI model based on the plurality of architecture documents. In some embodiments, the identifying may include executing the GenAI model on best practice architecture documents and identifying the missing component based on a component within the software architecture that the GenAI model detects as not being best practice based on the plurality of architecture documents.

In some embodiments, the identifying may include identifying a location within the software architecture for a new application programming interface (API) between a software component in the first domain and another software component in the second domain by the GenAI model based on the plurality of architecture documents. In some embodiments, the generating may include generating a description of the missing component via the GenAI model based on architecture diagrams of the first and second domains from among the plurality of architecture documents. In some embodiments, the method may further include training the GenAI model based on the execution of the GenAI model on descriptions of software applications within the software architecture, architecture blueprints of the software architecture, and security policies associated with the software architecture. In some embodiments, the method may further include generating a prompt with a request for information about the software by the GenAI model based on the plurality of architecture documents and displaying the prompt on the user interface.

Figure 10D:
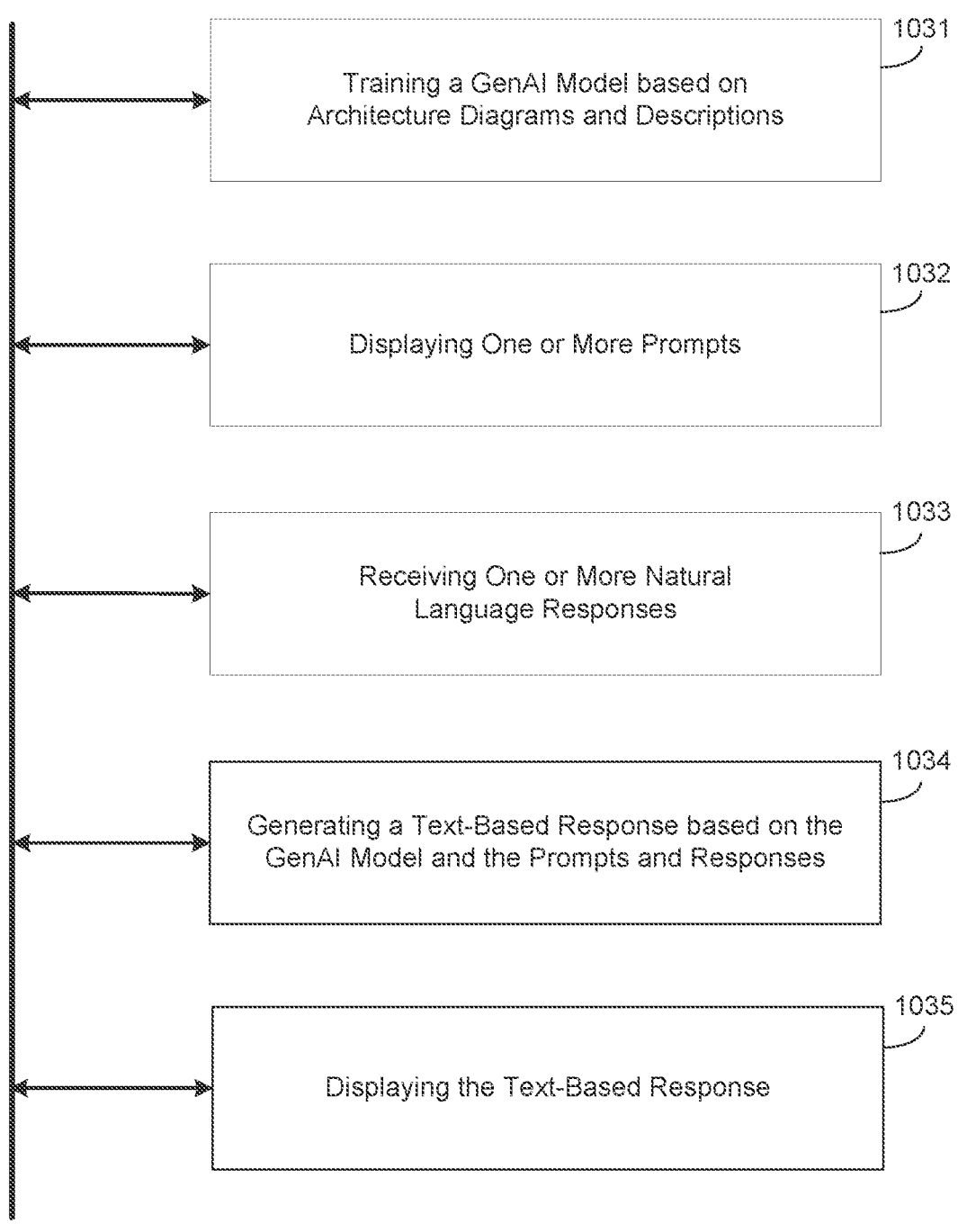
FIG. 10D is a diagram illustrating a method of auditing a software architecture via a GenAI model according to example embodiments.

FIG. 10D illustrates a method 1030 of auditing a software architecture via a GenAI model according to example embodiments. As an example, the method 1030 may be performed by a computing system, a software application, a server, a cloud platform, a combination of systems, and the like. Referring to FIG. 10D, in 1031, the method may include training a generative artificial intelligence (GenAI) model based on architecture diagrams of a software architecture and descriptions of the architecture diagrams. In 1032, the method may include displaying one or more prompts on a user interface. In 1033, the method may include receiving one or more natural language responses associated with the software architecture in response to the one or more prompts. In 1034, the method may include generating a text-based response to the natural language query submitted via the user interface based on the execution of the GenAI model on the one or more prompts and the one or more natural language responses associated with the software architecture. In 1035, the method may include displaying the text-based response via the user interface.

In some embodiments, the method may further include generating a diagram that illustrates a portion of the software architecture based on the text-based response and displaying the diagram with the text-based response via the user interface. In some embodiments, the GenAI model may include a multi-modal model, and the generating may include generating the text-based response via a first mode of the multi-modal model and generating the diagram via a second mode of the multi-modal model. In some embodiments, the receiving may include receiving a question about the software architecture from a user and in response, generating an answer to the question based on execution of the GenAI model on the question and the one or more prompts and displaying the answer via the user interface.

In some embodiments, the training may include training the GenAI model based on the execution of the GenAI model on blueprints of the software architecture and descriptions of the software architecture. In some embodiments, the receiving may include receiving a request for a view of the software architecture, and the generating may further include generating a diagram of the view of the software architecture and displaying the diagram of the view via the user interface. In some embodiments, the method may further include receiving feedback about the text-based response and retraining the GenAI model based on the text-based response and the feedback to the text-based response. In some embodiments, the generating may further include receiving a runtime data from the software architecture and generating the text-based response to the natural language query based on the execution of the GenAI model on the runtime data.

FIG. 10E illustrates a method 1040 of generating a diagram of a software architecture based on conversation data according to example embodiments. As an example, the method 1040 may be performed by a computing system, a software application, a server, a cloud platform, a combination of systems, and the like. Referring to FIG. 10E, in 1041, the method may include receiving and recording electronic communications that occur between users of an organization within a data store. In 1042, the method may include receiving an input via a user interface. In 1043, the method may include retrieving the electronic communications of the organization and software architecture documents from the data store in response to receipt of the input. In 1044, the method may include generating a diagram of a software architecture of the organization based on the execution of a generative artificial intelligence (GenAI) model on the electronic communications of the organization and the software architecture documents. In 1045, the method may include displaying the diagram of the software architecture via a user interface.

In some embodiments, the method may further include training the GenAI model to generate the diagram based on the execution of the GenAI model on descriptions and images of software architectures. In some embodiments, the capturing may include capturing electronic communications, including one or more of an electronic mail, a phone call, and a meeting, and recording content from the captured electronic communications in the data store. In some embodiments, the method may further include validating the diagram of the software architecture based on a predefined validation model and displaying the results of the validation via the user interface.

In some embodiments, the method may further include generating a prompt with a request for information about the software architecture by the GenAI model based on the software architecture documents and displaying the prompt on the user interface. In some embodiments, the method may further include receiving a response to the prompt, and the generating may include generating the diagram of the software architecture of the organization based on the prompt and the response to the prompt. In some embodiments, the generating the diagram of the software architecture of the organization may include generating an image within a format of the software application, and the displaying may include displaying the image via a viewer of the software application within the user interface.

The above embodiments may be implemented in hardware, in a computer program executed by a processor, in firmware, or in a combination of the above. A computer program may be embodied on a computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 11g illustrates an example computer system architecture, which may represent or be integrated in any of the above-described components, etc.

FIG. 11 illustrates an example system 1100 that supports one or more of the example embodiments described and/or depicted herein. The system 1100 comprises a computer system/server 1102, which is operational with numerous other general-purpose or special-purpose computing system environments or configurations. Examples of well-known computing systems, environments, and/or configurations that may be suitable for use with computer system/server 1102 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 11, computer system/server 1102 in the example system 1100 is shown in the form of a general-purpose computing device. The components of computer system/server 1102 may include, but are not limited to, one or more processors or processing units (processor 1104), a system memory 1106, and a bus that couples various system components, including the system memory 1106 to the processor 1104.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system-readable media. Such media may be any available media that is accessible by computer system/server 1102, and it includes both volatile and non-volatile media, removable and non-removable media. The system memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may further include other removable/non-removable, volatile/non-volatile computer system storage media. By way of example only, storage system 1114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 1106 may include at least one program product having a set (e.g., at least one) of program modules that are configured to carry out the functions of various embodiments of the application.

Program/utility 1116, having a set (at least one) of program modules 1118, may be stored in the system memory 1106 by way of example, and not limitation, as well as an operating system, one or more application programs, other program modules, and program data. Each of the operating systems, one or more application programs, other program modules, and program data or some combination thereof may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present application may take the form of a computer program product embodied in one or more computer-readable medium(s) having computer-readable program code embodied thereon.

Computer system/server 1102 may also communicate with one or more external devices 1120 such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces 1124. Still yet, computer system/server 1102 can communicate with one or more networks, such as a local area network (LAN), a general wide area network (WAN), and/or a public network (e.g., the Internet) via network adapter 1126. As depicted, network adapter 1126 communicates with the other components of computer system/server 1102 via a bus. Although not shown, other hardware and/or software components could be used in conjunction with the computer system/server 1102. Examples include but are not limited to microcode, device drivers, redundant processing units, external disk drive arrays, RAID systems, tape drives, and data archival storage systems, etc.

Although an exemplary embodiment of at least one of a system, method, and computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system"

is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations, which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the application components, as generally described and illustrated in the figures herein, may be arranged and designed in a wide variety of configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, certain modifications, variations, and alternative constructions would be apparent to those of skill in the art.

While preferred embodiments of the present application have been described, it is to be understood that the embodiments described are illustrative only. The scope of the application is to be defined solely by the appended claims when considered with a full range of equivalents and modifications (e.g., protocols, hardware devices, software platforms, etc.) thereto.

What is claimed is:

1. An apparatus comprising:
a processor executing an artificial intelligence (AI) model comprising a first mode of operation and a second mode of operation, wherein the AI model executes the first mode of operation to:
  receive multiple architecture views corresponding to different parts of a software architecture, and
  convert the multiple architecture views into corresponding text and graphics, and
wherein the AI model executes the second mode of operation to:
  generate an architecture diagram combining the corresponding text and graphics, and edges, comprising annotations, that connect software components across the multiple architecture views,
  identify a misalignment between two software components of the software architecture based on an identification that a software component necessary for alignment between two architecture views is missing, based on the architecture diagram, and
  recommend software component to add to the software architecture to correct the misalignment.

2. The apparatus of claim 1, wherein the AI model is configured to:
identify that a majority of the different parts of the software architecture use a certain standard,
wherein, when the AI model recommends the software component, it recommends a software component based on the certain standard.

3. The apparatus of claim 1, wherein the AI model is configured to:
identify the software component based on a difference in requirements between the two architecture views.

4. The apparatus of claim 1, wherein the AI model configured to:
identify the software component based on best practice architecture documents.

5. The apparatus of claim 1, wherein the AI model configured to:
identify a location within the software architecture for a new application programming interface (API) that connects the two software components.

6. The apparatus of claim 1, wherein the AI model configured to:
generate a description of the software component based on the architecture diagram.

7. The apparatus of claim 1, wherein the corresponding text and graphics are a unified markup language (UML) diagram.

8. The apparatus of claim 1, wherein the corresponding text and graphics trains the second mode of operation.

9. A method performed by an artificial intelligence (AI) model comprising a first mode of operation and a second mode of operation, the method comprising:
using the first mode of operation:
  receiving multiple architecture views corresponding to different parts of a software architecture, and
  converting the multiple architecture views into corresponding text and graphics; and
using the second mode of operation:
  generating an architecture diagram combining the corresponding text and graphics, and edges, comprising annotations, that connect software components across the multiple architecture views;
  identifying a misalignment between two software components of the software architecture based on an identification that a software component necessary for alignment between two architecture views is missing, based on the architecture diagram; and recommending a software component to add to the software architecture to correct the misalignment.

10. The method of claim 9, comprising:

identifying that a majority of the different parts of the software architecture use a certain standard, wherein the recommending of the software component comprises:

recommending a software component based on the certain standard.

11. The method of claim 9, comprising:

identifying the software component based on a difference in requirements between the two architecture views.

12. The method of claim 9, comprising:

identifying the software component based on best practice architecture documents.

13. The method of claim 9, comprising:

identifying a location within the software architecture for a new application programming interface (API) that connects the two software components.

14. The method of claim 9, comprising:

generating a description of the software component based on the architecture diagram.

15. The method of claim 9, wherein the corresponding text and graphics are a unified markup language (UML).

16. The method of claim 9, wherein the corresponding text and graphics trains the second mode of operation.

17. A non-transitory computer-readable medium comprising instructions that, when executed by a processor executing an artificial intelligence (AI) model comprising a first mode of operation and a second mode of operation, cause the AI model to perform:

using the first mode of operation:

receiving multiple architecture views corresponding to different parts of a software architecture, and converting the multiple architecture views into corresponding text and graphics; and using the second mode of operation:

generating an architecture diagram combining the corresponding text and graphics, and edges, comprising annotations, that connect software components across the multiple architecture views;

identifying a misalignment between two software components of the software architecture based on an identification that a software component necessary for alignment between two architecture views is missing, based on the architecture diagram; and recommending a software component to add to the software architecture to correct the misalignment.

18. The non-transitory computer-readable medium of claim 17, wherein the instructions cause the AI model to perform:

identifying that a majority of the different parts of the software architecture use a certain standard, wherein the recommending of the software component comprises:

recommending a software component based on the certain standard.

19. The non-transitory computer-readable medium of claim 17, wherein the instructions cause the AI model to perform:

identifying the software component based on a difference in requirements between the two architecture views.

20. The non-transitory computer-readable medium of claim 17, wherein the instructions cause the AI model to perform:

identifying the software component based on best practice architecture documents.

* * * * *